United States Patent
Gerard et al.

(10) Patent No.: US 7,268,092 B2
(45) Date of Patent: *Sep. 11, 2007

(54) SHEET MOLDING COMPOUND HAVING IMPROVED CHARACTERISTICS

(75) Inventors: Jacques H. Gerard, Olne (BE); David E. Adam, deceased, late of Pataskala, OH (US); Frank R. Cichocki, Reynoldsburg, OH (US); Michael H. Jander, Eupen (BE); Paul R. Krumlauf, Thornville, OH (US); Giovanni Montagna, Battice (BE); Donald B. Sage, Amarillo, TX (US)

(73) Assignees: Owens-Corning Fiberglas Technology Inc., Summit, IL (US); Owens Corning Composites SPRL, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 10/269,167

(22) Filed: Oct. 11, 2002

(65) Prior Publication Data

US 2003/0165670 A1 Sep. 4, 2003

Related U.S. Application Data

(60) Provisional application No. 60/328,860, filed on Oct. 12, 2001.

(51) Int. Cl.
- *B32B 27/12* (2006.01)
- *B32B 5/26* (2006.01)
- *B32B 9/04* (2006.01)
- *D04H 1/00* (2006.01)

(52) U.S. Cl. ............ 442/394; 442/354; 442/358; 442/393; 442/367; 428/411.1

(58) Field of Classification Search ........ 442/354, 442/358, 393, 394, 367
See application file for complete search history.

(56) References Cited

U.S. PATENT DOCUMENTS

| | | |
|---|---|---|
| 2,750,315 A | 6/1956 | Tierney |
| 3,562,088 A | 2/1971 | Newman |
| 3,567,671 A | 3/1971 | Janetos |
| 3,620,906 A | 11/1971 | Hannes |
| 3,660,196 A | 5/1972 | Keeling |
| 3,716,437 A | 2/1973 | Newman |
| 3,734,814 A | 5/1973 | Davis, Sr. et al. |
| 3,788,271 A | 1/1974 | Carpenter |
| 3,874,973 A | 4/1975 | Jeanson |
| 3,969,178 A | 7/1976 | Jeanson |
| 4,044,188 A | 8/1977 | Segal |

(Continued)

FOREIGN PATENT DOCUMENTS

DE 19949318 3/2001

(Continued)

*Primary Examiner*—Lynda Salvatore
(74) *Attorney, Agent, or Firm*—Inger H. Eckert; Margaret S. Millikin

(57) ABSTRACT

A composite part made from a sheet molding compound is disclosed as having improved characteristics over traditional sheet molding compound composite parts. The fibrous material is introduced as a veil layer adjacent a paste layer, the veil flows well during the molding process. The improved flow and surface characteristics of a composite part are attributed to the elongation of the veil during molding and to the improved filling capabilities.

11 Claims, 10 Drawing Sheets

U.S. PATENT DOCUMENTS

| | | | |
|---|---|---|---|
| 4,098,630 A | 7/1978 | Morse | |
| 4,105,623 A | 8/1978 | Shannon et al. | |
| 4,207,282 A | 6/1980 | Grisch | |
| 4,239,794 A | 12/1980 | Allard | |
| 4,278,491 A | 7/1981 | Morse | |
| 4,278,720 A | 7/1981 | Shannon | |
| 4,282,049 A | 8/1981 | Morse | |
| 4,302,499 A | 11/1981 | Grisch | |
| 4,303,716 A | 12/1981 | Eshbach | |
| 4,308,313 A | 12/1981 | Groff | |
| 4,362,675 A | 12/1982 | Shannon | |
| 4,430,284 A | 2/1984 | Rasmussen | |
| 4,434,023 A | 2/1984 | Kanamori et al. | |
| 4,474,845 A | 10/1984 | Hagerman et al. | |
| 4,500,595 A | 2/1985 | Gerteisen et al. | |
| 4,554,204 A | 11/1985 | Ono et al. | |
| 4,604,303 A * | 8/1986 | Takakura et al. | 428/457 |
| 4,689,098 A | 8/1987 | Gaughan | |
| 4,695,501 A * | 9/1987 | Robinson | 442/372 |
| 4,716,072 A | 12/1987 | Kim | |
| 4,781,876 A | 11/1988 | Kia | |
| 4,784,899 A | 11/1988 | Ono et al. | |
| 4,989,538 A | 2/1991 | Tamura et al. | |
| 5,001,000 A | 3/1991 | Rohrbacher et al. | |
| 5,009,821 A | 4/1991 | Weaver | |
| 5,078,934 A | 1/1992 | Yamamoto et al. | |
| 5,225,135 A | 7/1993 | Kia | |
| 5,266,138 A | 11/1993 | Razavi | |
| 5,358,779 A | 10/1994 | McGarry | |
| 5,391,344 A | 2/1995 | Rains et al. | |
| 5,395,470 A | 3/1995 | Toh et al. | |
| 5,403,631 A | 4/1995 | Sato et al. | |
| 5,487,928 A | 1/1996 | Fujimoto | |
| 5,490,893 A | 2/1996 | Enlow et al. | |
| 5,496,509 A | 3/1996 | Yamamoto et al. | |
| 5,518,577 A | 5/1996 | Jinbo et al. | |
| 5,635,252 A | 6/1997 | Fraser, Jr. et al. | |
| 5,653,923 A | 8/1997 | Spoo et al. | |
| 5,656,675 A * | 8/1997 | Kobayashi et al. | 428/424.8 |
| 5,811,046 A | 9/1998 | Dous et al. | |
| 5,858,404 A | 1/1999 | Dous et al. | |
| 5,888,340 A | 3/1999 | Vyakarnam et al. | |
| 5,935,879 A | 8/1999 | Helwig et al. | |
| 5,959,031 A | 9/1999 | Thurgood | |
| 5,980,400 A * | 11/1999 | Schickert | 473/481 |
| 6,001,919 A | 12/1999 | Yen et al. | |
| 6,103,032 A | 8/2000 | Greve | |
| 6,119,750 A | 9/2000 | Greve | |

FOREIGN PATENT DOCUMENTS

| | | |
|---|---|---|
| EP | 0 273 145 A | 7/1988 |
| EP | 0 805 187 A | 11/1997 |
| EP | 1099541 | 5/2001 |

* cited by examiner

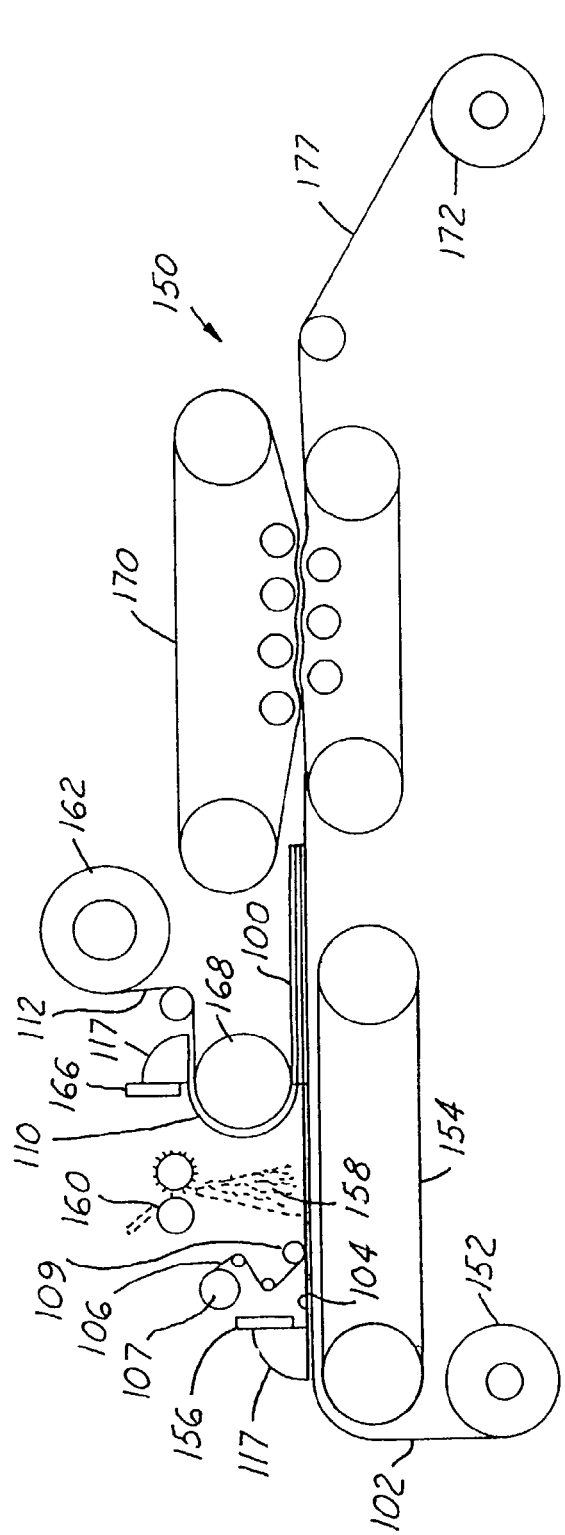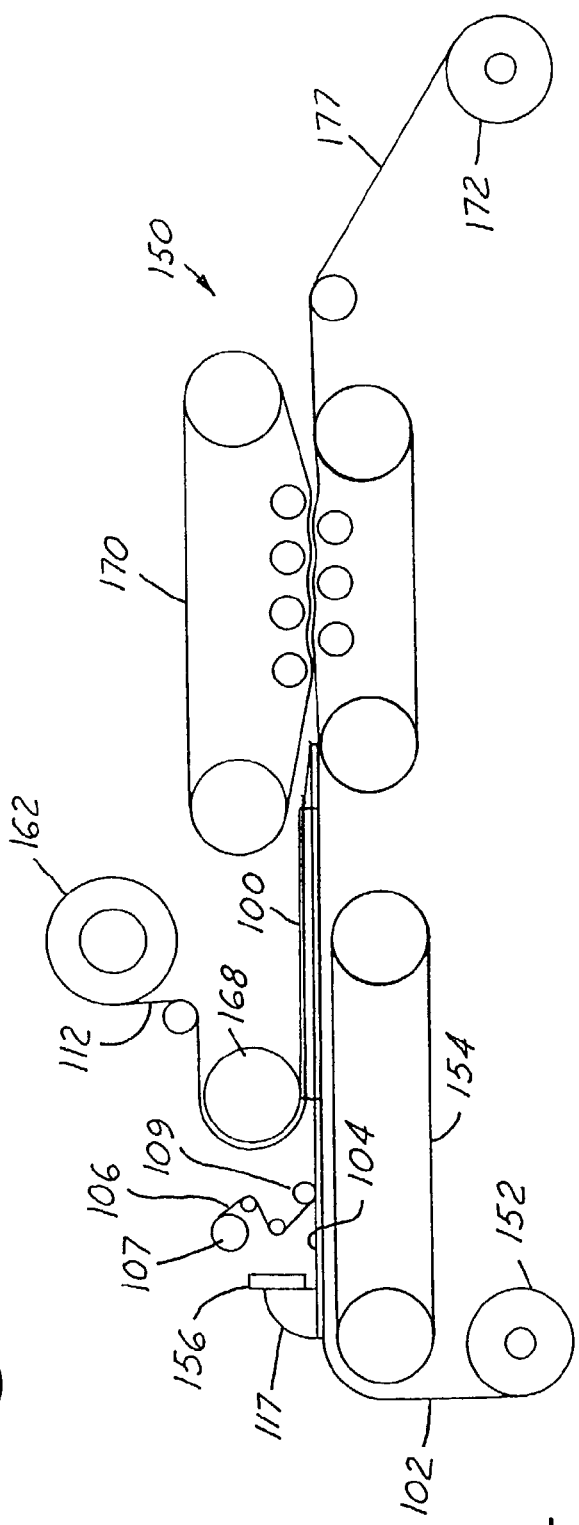
FIG.5
FIG.6

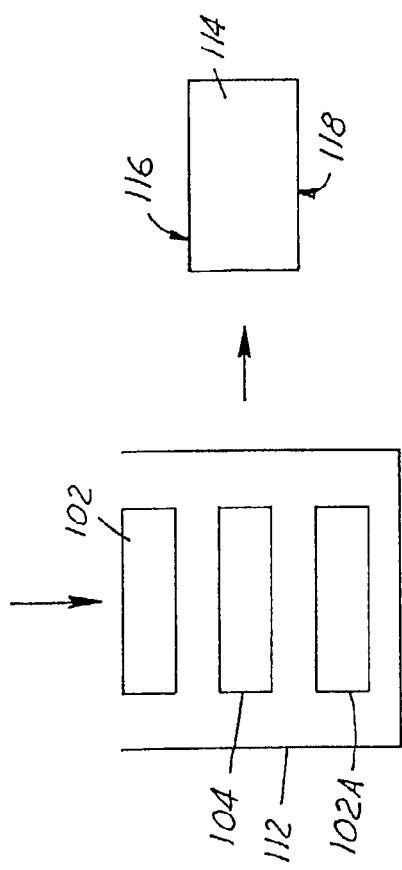
FIG. 13
FIG. 11
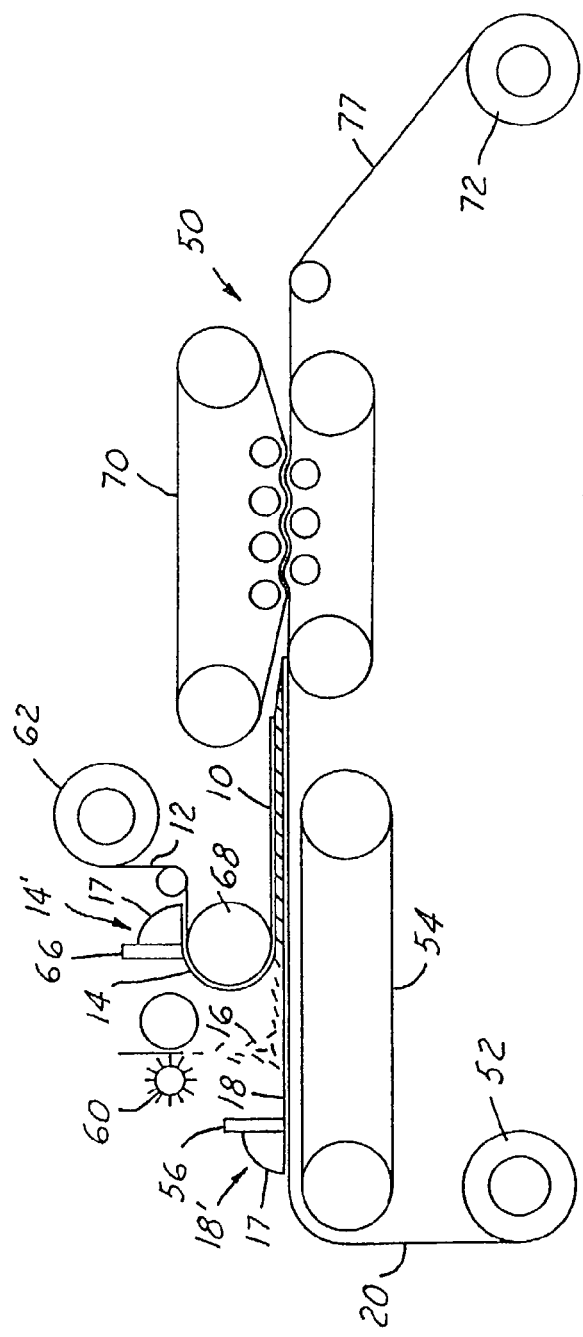
FIG. 12

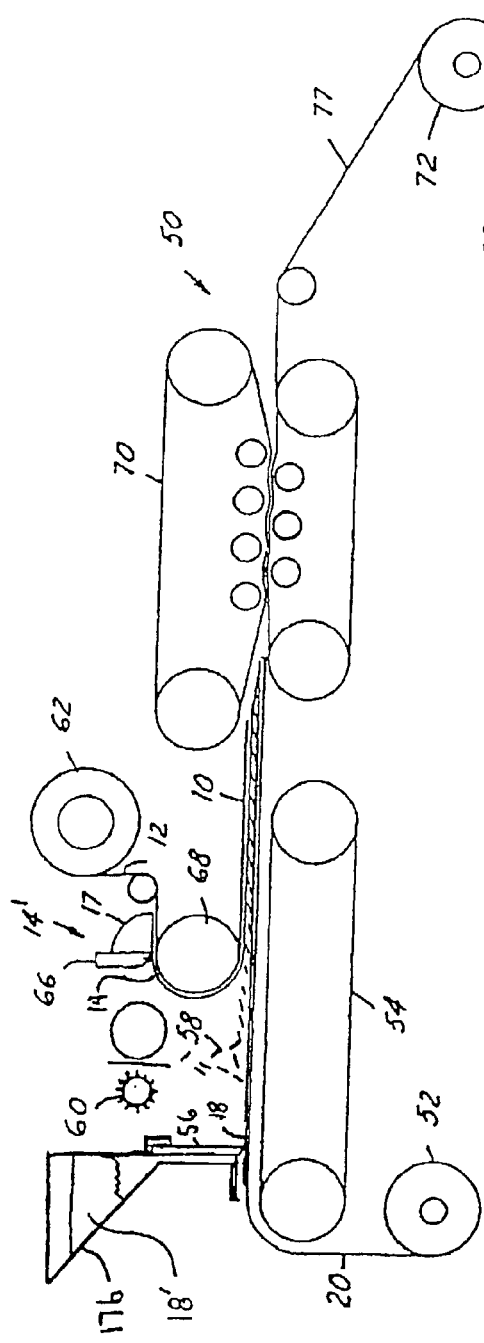

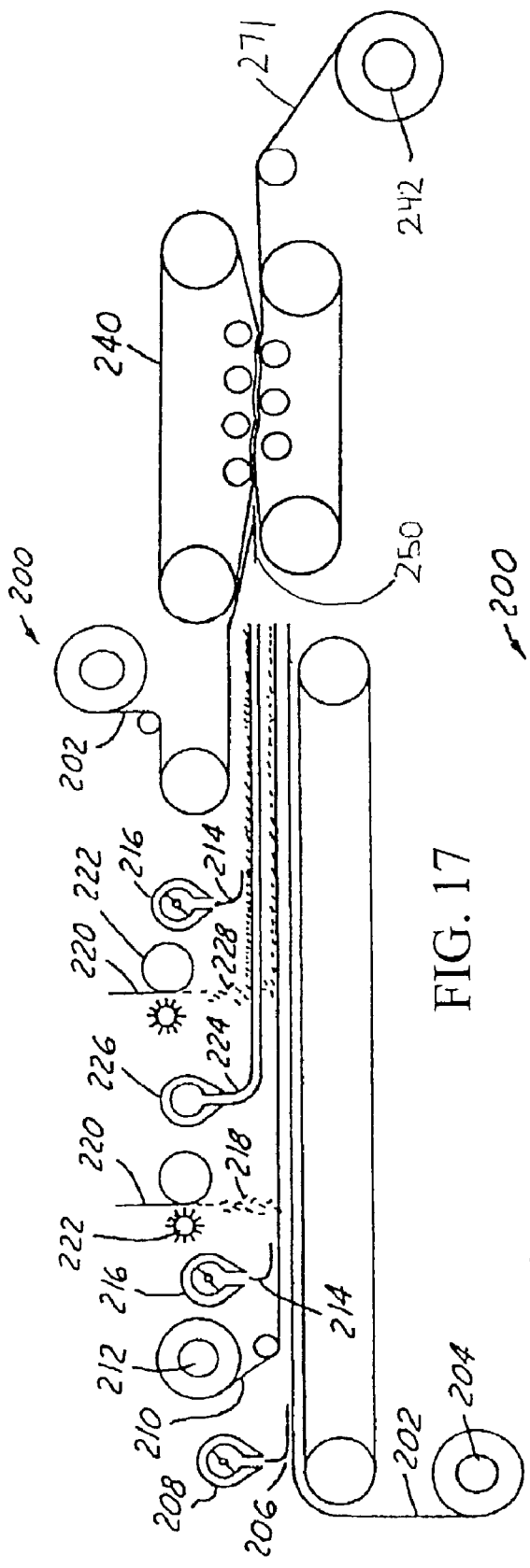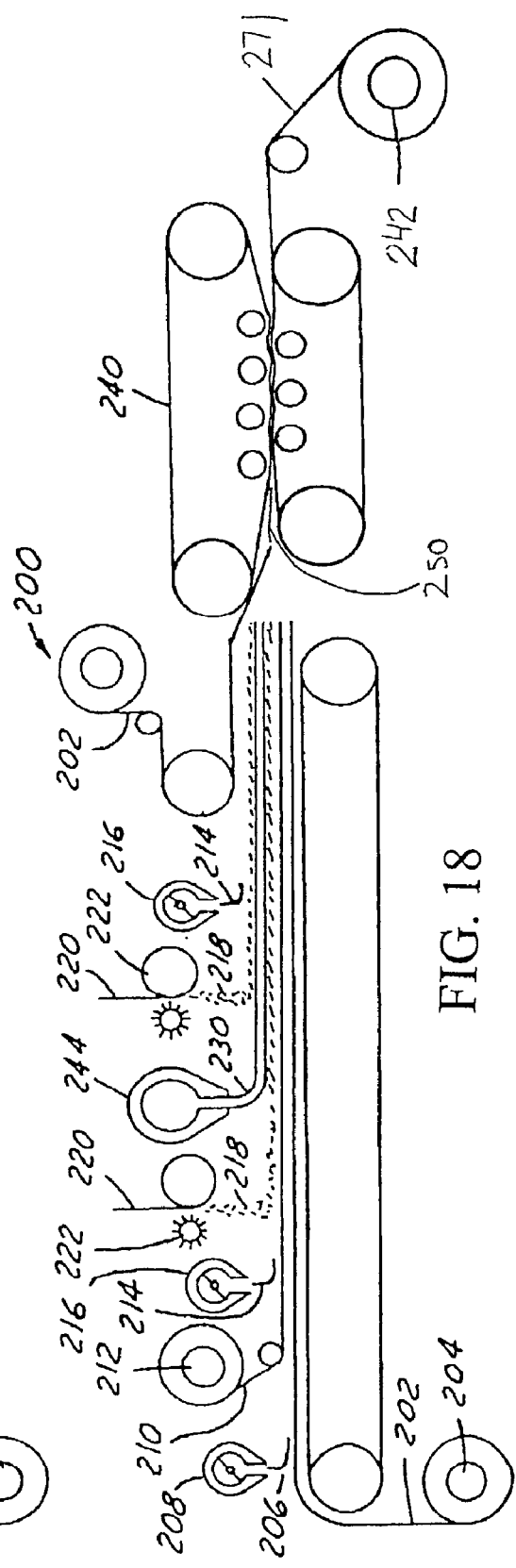

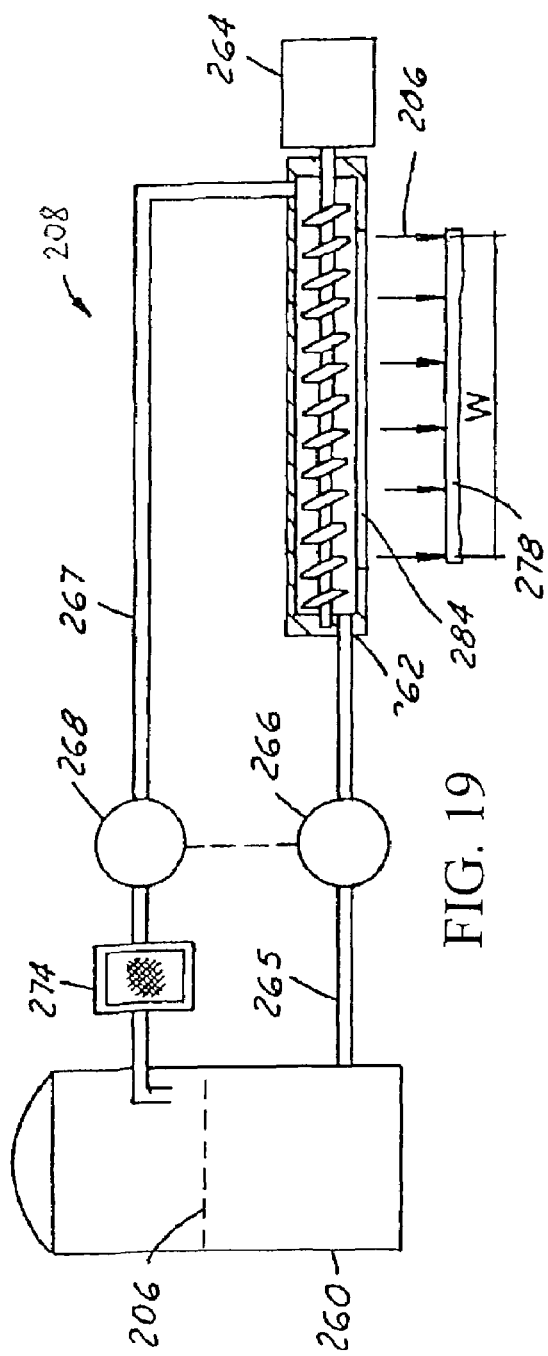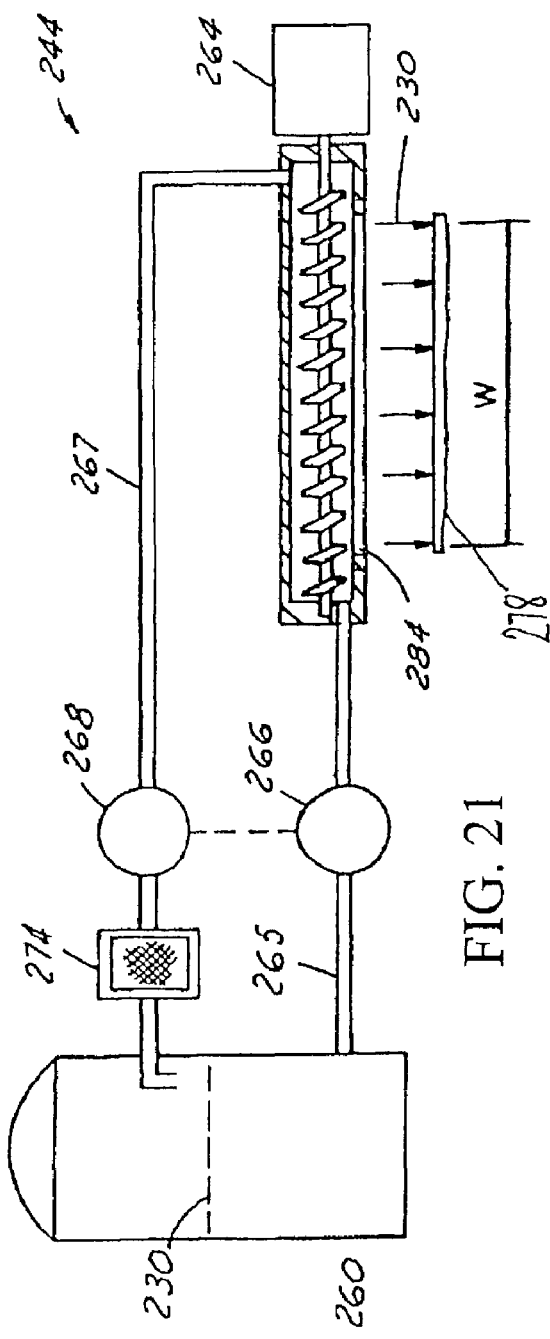
FIG. 19
FIG. 21

SHEET MOLDING COMPOUND HAVING IMPROVED CHARACTERISTICS

CROSS-REFERENCE TO RELATED APPLICATIONS

The present invention claims priority from Provisional Application Ser. No. 60/328,860 entitled "Sheet Molding Compound Having Improved Characteristics," filed Oct. 12, 2001.

TECHNICAL FIELD AND INDUSTRIAL APPLICABILITY OF THE INVENTION

The present invention relates generally to reinforced fiber composites and more specifically to sheet molding compounds having improved characteristics.

BACKGROUND OF THE INVENTION

In the manufacture of fiber reinforced resin products, sheet molding compounds are frequently used. Sheet molding compounds offer an appealing solution for the production of Class A surface parts compared to steel in terms of cost, weight, styling flexibility and corrosion resistance.

Sheet molding compounds consist of a mixture of a thermosetting resin, a thermoplastic (typically dissolved in styrene) and catalyst, particulate filler and chopped reinforcement fibers, such as glass fibers. In most cases, the resin and chopped fibers are sandwiched between films of plastic material to form a laminated sheet that is wound in rolled form or festooned for storage. The laminated sheet is stored under conditions that will not result in final curing of the resin, but will allow the paste to thicken from typically a 10,000 to 40,000 centipoise (milliPascal seconds-mPa·s) range to a desired molding viscosity range, typically between 30,000,000 and 50,000,000 centipoise (mPa·s). At the time of use, the protective carrier film is removed and the laminated sheet is cut into blanks, or plies, of a desired shape and size. The plies are then molded to form a cured composite part. In most applications, multiple plies of the laminated sheets are used in the composite structure and typically comprise between 25 and 50% of the die/tool's surface area. When the laminated sheets are molded, the resin and glass flow within the mold under heat and pressure to cover the entire surface of the mold. Sheet molding compounds are used in a variety of applications that require aesthetic appeal, corrosion resistance, lighter weight dimensional control and high strength.

One deficiency with currently available sheet molding compounds is that the charge may not form a Class A type surface part when molded and cured. This is due to the fact that sometimes the chopped fibers move to the surface of the sheet molding compound to form surface imperfections. Further, the sheet molding compound sometimes does not flow well in the mold, especially if it is loaded incorrectly, and this creates surface imperfections such as surface pores. Thus, some SMC composite parts may be scrapped, or require sanding and repair, or must otherwise be reworked to be used in applications requiring a desired surface appearance.

Yet another problem with surface characteristics occurs when these composite parts formed from the sheet molding plies are painted. Paint pops may be caused by the release of volatile liquids (such as water, styrene or di-vinyl benzene monomer) from the sheet molding paste or by the release of moisture or solvents contained in the resin or within/around fiber bundles during the curing process. These are quite common, typically affecting 5–10% or more of painted SMC composite parts, leading to substantial cost in terms of rework and waste.

In addition, to allow a long and uniform flow that will produce a wave-free surface, the fibers used in sheet molding compounds are typically provided by the glass manufacturer as bundles or "splits" of multiple filaments. The act of impregnating the bed of chopped fibers between two layers of sheet molding compound paste often leaves air trapped within the composite sheet, often beside or between the bundles, where small differences in surface tension adversely affects the wetting of the bundles or splits. Unfortunately, this bundling may also include entrapped air which, when released during the flow, produces tiny bubbles which travel slowly under a pressure gradient. To evacuate these bubbles, it is useful to have the molding compound flow to fill out the tool to allow the action of the pressure gradients to move those air bubbles towards the edge of the flow front and thus towards the edge of the part. Such large flow typically calls for loading the tool by a charge representing 50% or less of the area of the part. Others have shown that molding under vacuum may aid in the removal of extraneous gases.

In addition, the flow of the various stacked sheets in the charge is not homogeneous. The sheets in the center of the stack flow more slowly than those in contact with the tool (mold). This does not allow the use of special treatment to the top layer to solve the problem of paint popping.

Another problem with currently available sheet molding compounds is that they are difficult to paint along with steel parts in a conventional assembly line painting system. Typically, composite parts require the use of a conductive primer applied prior to the application of an ornamental surface paint. To improve electrostatic sprayability, conductive materials have been introduced to sheet molding compounds. However, typical sheet molding compounds require large amounts of conductive materials to be introduced in order to improve surface conductivity enough to be effectively electrostatically sprayable. This increases raw material costs and can decrease surface quality associated with increased fiber loading.

One potential way to produce sheet molding compounds has been to locally sandwich a small piece of wet process textile mat, instead of chopped fibers, in a localized area between layers of sheet molding compound paste and molding the resultant laminate into a composite part. However, the fiber contained within a conventional wet process textile veil mat does not flow well under pressure, and is not intended to do so. Thus, the composite parts formed by this process have similar poor surface characteristics as composite parts formed with chopped fibers.

U.S. Pat. No. 4,302,499 illustrates a method of making a moldable composite, including the steps of providing a fabric material on the outside of an SMC sheet, as shown in FIGS. 3 and 5 of the '499 patent, to provide corrosion resistance and avoid fiber read-through. In the '499 patent, the resin flows through the veil during molding to form a resin-rich layer on the outside of the veil, but no resin is provided on the outside of the veil. Additionally, the '499 patent indicates the properties of the veil are critical, and describes these properties to include that the veil must be permeable so the resin flows through the veil during the molding process and that the veil must posses a grab break strength of at least ten pounds per inch in both longitudinal and transverse directions so as to avoid tearing during compression molding. Thus, the '499 patent includes a system as shown in FIG. 2, where the veil is draped over the entire tool surface, and the veil is strong enough to remain intact without tearing, while the veil does not apparently flow with the resin during molding. The second embodiment shown in FIGS. 4 and 5 is further described in Example 1, and uses a synthetic fabric (Nexus), capable of substantial elongation, but which is molded at relatively low temperature (275 F), and which provides the fabric on the outer surface of the resin, and where the resin flows through the veil during molding. The '499 patent does not teach a method for making a Class A surface part.

A further deficiency in the current technology is that sheet weight is limited due to the currently available manufacturing techniques. Typically resin, or sheet molding paste, is applied to two carrier film layers using a doctor blade, and a layer of chopped glass or glass mat is sandwiched between the two resin-coated layers to form a composite sheet. One such sheet molding compounding line is shown in U.S. Pat. No. 6,251,974 to Rossi et al., which is herein incorporated by reference. Another such sheet molding compounding line is shown in U.S. Pat. Nos. 6,103,032 and 6,119,750 to Greve, assigned to the Budd Company, which are herein incorporated by reference. The use of doctor blades, usually an upside down weir blade, to apply the sheet molding paste allows only two layers of sheet molding paste to be used, since the prior art teaches that a carrier film passes below the doctor blade to form each layer of paste, and this carrier film must be at the outside of the sheet to be removed and disposed prior to molding. Accordingly, because there is only two resin layers, the need to penetrate the sheet molding paste through the fiber package while maintaining proper paste/fiber distribution limits the thickness achievable. Thus, in the prior art, several layers of the composite sheet are required to be placed in a tool to provide a charge having the desired amount of material for the composite part.

Yet another deficiency in the current technology is that sheet weight is inconsistent. This is attributed to the viscosity changes in the sheet molding paste attributed to thickening and the use of doctor blade or other paste dispensing devices as metering tools whose throughput rates are dependent upon the viscosity of the metered media. Consequently, in order to manufacture a part having a constant weight and volume, the charge size must be adjusted from part to part, which leads to inconsistencies in flow and performance of composite parts.

It is therefore highly desirable to improve the characteristics of sheet molding compound. This would allow sheet molding compound parts to be used in a wider variety of composite applications wherein surface quality as well as scrap and rework is a concern.

It is thus also highly desirable to improve the electrostatic sprayability of composite parts made of sheet molding compounds.

SUMMARY OF THE INVENTION

It is thus an object of the present invention to improve the physical and surface characteristics and electrostatic sprayability of composites parts made of sheet molding compound composite sheets.

The above object may be accomplished by replacing all or a portion of the fibrous material introduced as chopped fibers or a mat with a wet process textile mat having unique soft and lofted, or irregularly shaped, non-continuous fibrous material that flows well during the molding process. The improved flow is attributed to the unkinking of the fibrous material. This also provides a barrier layer that keeps reinforcement bundles from migrating to the surface of the composite part.

By introducing a plurality of conductive material to the mat having the irregularly shaped fibers, an electrostatically sprayable composite part having improved surface characteristics made of sheet molding compound may be realized.

Another feature of the present invention includes a new and unique way of introducing the sheet molding paste to a sheet molding compound via a simple volumetric extrusion paste delivery systems compared with traditional doctor box systems. This allows for several paste layers to be introduced on a single compounding line. Further, this embodiment also allows thicker composite sheets to be produced since the paste layer is not required to go through the entire sheet thickness. This also allows for the manufacture of composite parts from a single composite sheet, or charge, which can cover most of the mold's surface. Alternatively, a composite part can be made with a top layer of the thicker sheet molding composite sheet of the present invention and other layers of conventional sheet molding compound.

This also allows for the manufacture of a composite part in which the top layer is specifically constituted to be void free and to follow the "plug" flow of the unique underlying charge to cover entire visible Class A surface of the part. With this pore free layer, the need for a long flow of the sheet to expel air is suppressed.

Also, the present invention provides sheet molding compound composite sheets having specially built layers within a single compounding line. For example, composite sheets and molded composite parts can be provided having special surface attributes such as improved surface conductivity, ultraviolet light stabilized surfaces, colored surfaces, enhanced crashworthiness and the like. Further, the present invention allows the use of recycled materials or low density core materials that function to decrease cost and weight. Further, by introducing a veil as described above, a barrier layer that keeps reinforcement bundles from migrating to the surface of the composite part can be achieved.

Other objects and advantages of the present invention will become apparent upon considering the following detailed description and appended claims, and upon reference to the accompanying drawings.

BRIEF DESCRIPTION OF THE DRAWINGS

FIG. 5 is a schematic diagram for making the sheet molding compound of FIG. 2; and FIG. 6 is a schematic diagram for making the sheet molding compound of FIG. 3.

FIG. 11 is a cross-sectional view of a sheet molding compound composite sheet prior to compaction according to one preferred embodiment of the present invention;.

FIG. 12 is a schematic diagram for making a sheet molding composite sheet of FIG. 11 and sheet molding compound; and FIG. 13 is a schematic diagram for making a conductive sheet molding compound composite sheet using at least one ply of the sheet molding compound of FIG. 12.

FIG. 14 is an alternate schematic diagram for making the sheet molding compound of FIG. 12

FIG. 15 is a close-up view of the funnel shaped dispensing device of FIG. 14;

FIG. 16 is an enlarged partial cross sectional view of the funnel shaped dispensing device shown in FIG. 15.

FIGS. 17 and 18 are further schematic diagrams for making sheet molding compound according to another preferred embodiment of the present invention;

FIG. 19 is a close-up view of one of the volumetric paste extrusion devices used in FIG. 17;

FIG. 21 is a close-up of the bulk molding volumetric extrusion device of FIG. 18;

DETAILED DESCRIPTION AND PREFERRED EMBODIMENTS OF THE INVENTION

Figure 1:
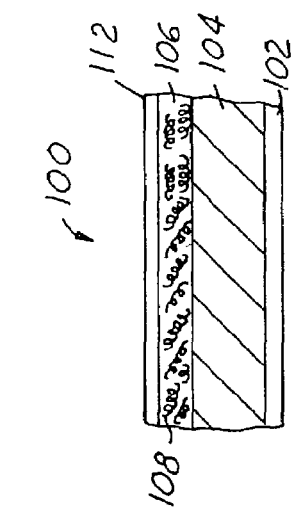
FIGS. 1–3 are perspective views of a sheet molding compound having improved surface characteristics according to three preferred embodiments of the present invention.
Figure 2:
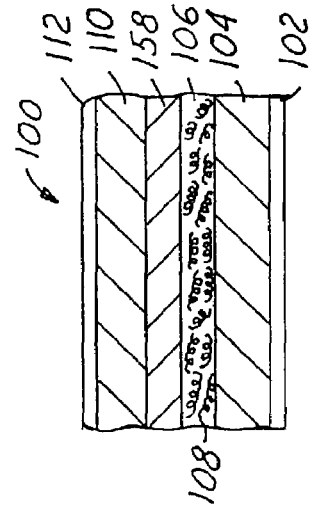
Figure 3:
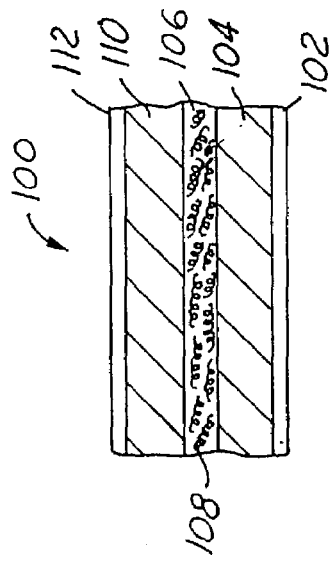

FIGS. 1–3 show three preferred embodiments for a sheet molding compound sheet 100 used to make a sheet molding compound part having superior surface characteristics.

Referring now to FIG. 1, a sheet molding compound sheet 100 is shown as having a first carrier film layer 102, a first paste layer 104, a mat, or performed veil 106, having elongation along the length and width of the veil, preferably achieved by using a plurality of non-continuous irregularly shaped glass fibers 108 in the veil, a second paste layer 110, and a second carrier film layer 112. Although fibers 108 are illustrated as being irregularly shaped, as further described below, such fibers may alternatively comprise long chopped or irregularly continuous fibers. "Fibers" as used herein may comprise individual filaments, or bundles of filaments. "Elongation" as used herein comprises the veil being able to stretch along the length and/or width of the veil without substantial separation of the fibers to form discontinuities or holes (or tearing), so as to form a substantially continuous layer of veil adjacent to, and which ensures the resin-rich surface of a part. "Elongation" may also comprise flowing fibers from the veil along with the paste during molding of the part, such that when the viscous paste flows within the mold during compression molding, the veil fibers flow with the paste to form a substantially continuous layer adjacent the resin-rich layer of the part, especially when one describes a wet elongation, which occurs after the veil is wet out with the paste, and with the present invention the binder preferably dissolves in the paste to facilitate such wet elongation. As will be seen in FIG. 4, the sheet 100 is compacted to allow wetout of the paste comprising the paste layers 104, 110 through the veil 106 to form a ply of a sheet molding compound sheet (shown as 177 In FIG. 4). During compaction the paste layer 104 is pressed into the veil layer 106. Essentially, the compacted veil 106 and paste layer 104 serves as a barrier layer, and the integrity of the paste in the barrier layer is maintained by the filaments in the veil 106 portion of the barrier layer.

The barrier layer serves to avoid the passage of volatile liquids or gases through the paste layer to the surface, and which would otherwise form resultant voids or pockets at (or close to) the surface of the part. The uniformly reinforced barrier layer moreover prevents the formation of cracks at the surface, which are another type if site for solvents to be adsorbed. The pockets and cracks are responsible in part for the paint pops, as these defects retain volatiles primarily from the paint which boil off and damage the paint surface during the curing of paint applied to the surface. The veil and barrier layer also prevent the underlying reinforcement fibers from reading through to the surface. Preferably, the glass content in the barrier layer (in the form of veil firmaments) comprises about ten percent. The paste may be a commercially available resin for forming a Class A surface, and typically consists of a mixture of a thermosetting resin, a thermoplastic (typically dissolved in styrene) and catalyst, and particulate filler, and may optionally include other ingredients, such as fine chopped reinforcement fibers, such as glass fibers, pigments or dies, UV light stabilizing additives, elastomers, and other chemicals. Preferably the combined veil and paste layer has a substantially constant thickness and glass content across the molded part, or at least a gradual variation in thickness and glass content, so as to minimize variation in shrinkage and therefore minimize waviness of the Class A surface of the molded part.

In another preferred embodiment, as shown in FIG. 2, a layer of chopped reinforcing fibers 158 may be added on top of the veil 106 prior to, or after, the introduction of the second resin layer 110. These fibers 158 are preferably between 13 mm and 50 mm (0.5 and 2 inches) long and are made of glass, carbon fiber, or any other fibrous material. The amount of fiber 158 varies, but is preferably less than what is used in a traditional SMC paste. Further, the amount of fiber 158 added should preferably not exceed an amount which allows the sheet molding pastes 104, 110 to fully wet through the veil 106. As will be seen in FIG. 5, the sheet 100 is compacted to allow wetout of the paste comprising the paste layers 104, 110 through the veil 106 and fibers 158 to form a sheet molding compound sheet (shown as 177 in FIG. 5) which includes the barrier layer of paste and veil as described above. Alternatively, the reinforcing fibers 158 may be provided in a sheet form, such as in a glass strand mat In yet another preferred embodiment, as depicted in FIG. 3, the second carrier film layer 112 is coupled directly onto the veil 106 without a second paste layer 110 to form an uncompacted sheet molding compound sheet 100. As will be seen in FIG. 5, the sheet 100 is compacted to allow wetout of the paste comprising the first paste layer 104 through the veil 106 to form a sheet molding compound sheet (shown as 177 in FIG. 6).

The composition of the first paste layer 104 and second paste layer 110 are normally typical formulations of sheet molding compound material without fibrous reinforcement for forming a Class A SMC part as are well known in the art. They consist essentially of polyester and thermoplastic resins, catalyst, internal mold release agents, inorganic fillers, and one or more thickening agents. For example, these pastes used in layers 104, 110 may be prepared having a composition as described below in Table 1. Alternatively, the paste layers 104, 110 could have a composition similar to what is described in U.S. Pat. No. 5,089,544 to Ross et al., which is herein incorporated by reference. A vacuum degassing device is used to remove air trapped in the paste before application. One such vacuum degassing device is known as a "Versator," manufactured by The Cornell Machine Company. Alternatively, the trapped air or gas might be removed using a process described in U.S. Pat. No. 6,218,458 to Vidaurre, which is herein incorporated by reference. Alternatively, the paste layers not providing the barrier layer (i.e. other than 104) could comprise another SMC paste having different characteristics than the top layer 104, including paste not capable of providing a Class A surface.

TABLE 1

SHEET MOLDING COMPOUND PASTE

| INGREDIENTS | WEIGHT | MANUFACTURER NAME | DESCRIPTION |
|---|---|---|---|
| T341 | 16.95 | AOC/Alpha Owens Corning | Polyester Resin in Styrene |
| T154 | 7.24 | AOC/Alpha Owens Corning | Thermoplastic Polyester resin in styrene |
| Styrene | 3.13 | Ashland | Styrene monomer |
| DVB | 1.33 | Dow | Divinyl benzene |
| P710 | 0.88 | BASF | Polypropylene oxide |
| PBQ | 0.008 | Aldrich | P-benzoquinone |
| CBA-60 | 0.88 | Witco | Non-ionic |
| 1300 × 40 | 0.59 | B. F. Goodrich | Hycar Rubber in styrene |
| TBPB | 0.53 | Atofina | T-butyl perbenzoate catalyst |
| Cal St | 1.18 | Mallinckrodt | Mold Release Agent |
| Huber 10-4 | 62.02 | Huber | Calcium carbonate |
| RP510 | 1.83 | AOC/Alpha Owens Corning | Thermoplastic polyester resin in Styrene |
| Zn St | 0.15 | Mallinckrodt | Mold release agent |
| PDI-1805 | 0.03 | Ferro | Iron pigment |
| Huber W-4 | 2.66 | Huber | Calcium carbonate |
| CaO | 0.53 | C. P. Hall | Alkaline earth oxide thickener |
| Water | 0.05 | | |

In a preferred embodiment, the veil 106 comprises irregularly shaped fibers 108, which are preferably non-continuous glass fibers that can take on a wide variety of shapes. For example, some fibers 108 may be helically shaped while others may be curled or bent in any other number of ways. The irregularly shaped fibers 108 exhibit better flow than is found in the straight fibers of the prior art during press molding to form a sheet molding compound sheet 177 and to form cured composite part. This results in better surface characteristics of cured composite parts in a wide variety of unique shapes than is available in the prior art. The improved surface characteristics are believed to be a result of the straightening of the fibers 108 and/or the lack of fiber bundles at or near a Class A surface as the sheet molding compound sheets 100 are compacted to form the sheet molding compound 177 and then subsequently heated and compressed to form the composite part. In an alternative embodiment, the irregularly shaped fibers essentially comprise a continuous filament provided in a continuous filament mat or long chopped fibers. Alternatively, the veil comprises a synthetic fiber having adequate strength and elongation to stretch as the sheet is compression molded, while providing a barrier to the reinforcing fibers to prevent fiber read-through at the surface of the barrier layer, and remain intact within the molding process (i.e. not melt to eliminate the veil from adjacent the barrier layer), which typically experiences temperatures of 150–160 degrees C. (300–315 degrees F.), and during the exothermic cure (during cross linking), reaches over 200 degrees C. (390 degrees F.), and may exceed 230 degrees C. (450 degrees F.) for a period of time (20 seconds or more). Preferably the fibers will not melt at 285 degrees C. (545 degrees F.).

The irregularly shaped fiber 108 may be produced in a number of different ways. For example, the fibers can be produced in a variety of processes as described in U.S. Pat. No. 5,431,992 to Houpt et al., which is herein incorporated by reference. In one method disclosed in Houpt et al., the irregularly shaped glass fibers 108 may be produced from a rotary fiber forming process. In this process, molten glass could be supplied from a furnace via forehearths to fiberizers. The fiberizers produce veils of irregularly shaped glass fibers that may be collected on a conveyor by means of a vacuum. As the fibers are blown downward by means of blowers in the fiberizers, they are attenuated and assume their irregular shape.

Alternatively, the non-woven fiber veil 106 having semi-coiled and coiled fibers 108 may be produced as described in U.S. Pat. Nos. 5,935,879; 5,972,166 or 6,054,022 to Helwig et al., which are also herein incorporated by reference. Further alternate commercially available veils, such as Hollingsworth & Vose Co. product numbers 8000064, 8000065, 8000068, 8000069, 8000114 and 8000115, or BGF Industries product numbers 497A, 504, 550, 627, 975, or Holinee LLC products Surmat N-700, Surmat N-751, Surmat N-754, Surmat N-758, Conformat N-701, Conformat N-720, Conformat N-764, Conformat N-780, or Owens Corning product numbers OC9001, OC9002, BF75, BV85, F3540-AE7, F35125P-YH21, F40305-XD31, or Freudenberg Group veils, or Viledon Group veils, may be used with the present invention, or other commercially available mats preferably meeting the solubility and wet elongation requirement.

To achieve the irregularly shaped glass fibers 108 of a preferred veil for the present invention, specific compositions satisfying a number of constraints are required. In Houpt et al., two such fibers 108 are provided which may be used individually or collectively. Preferably, a dual glass irregularly shaped fiber 108 is used, i.e. each fiber is composed of two different glass compositions, glass A and glass B. If one were to make a cross-section of an ideal irregularly shaped glass fiber of the present invention, one half of the fiber 108 would be glass A, with the other half glass B. In reality, a wide range of proportions of the amounts of glass A and glass B may exist in the veil 106, with the percentage of glass A varying from 15–85% by weight and the balance being glass B. In the Houpt et al. reference, glass A comprises a high-borate, low-soda lime-aluminosilicate composition, or glass having a borate content of between approximately 14 and 24% by weight of the total components. Also, glass B comprises a high-soda, low-borate lime-aluminosilicate composition, in which the soda content is between approximately 14 and 25% by weight of the total components.

The glass fibers 108 as described in Houpt et al. are then modified to form the veil 106. The general procedure for preparation of the veil 106 involves first preparing a slurry of irregularly shaped glass textile fibers 108 and organic polymeric binder at a concentration of 0.1 to 4.0% by weight in water. The polymeric binder may be in the form or powder or fiber, or both. Additionally, polyvinyl alcohol may be added to the slurry. The water may contain viscosity modifiers, surfactants, and defoaming agents that are commonly used in the manufacture of wet-laid nonwovens. Proportions of the materials excluding the water in the slurry may be in the range of approximately 10–50% by weight binder fiber, approximately 50 to 90% by weight irregularly shaped glass 108, binder powder, or mixtures thereof, and approximately 0 to 15% by weight polyvinyl alcohol.

After the fibers 108 have been dispersed, the slurry is transferred to the forming section of an inclined-wire Fourdrinier machine and dewatered. The resulting web is passed through an oven to dry the mat and fuse the binder fibers and/or binder powder to the glass fibers 108. A secondary binder may then be applied by saturating the dry mat with a water-based polymer composition and removing the excess with a vacuum slot. The mat is then passed through a second oven where it is again dried and the binder cured to form the veil 106.

Alternatively, a wire cylinder, Stevens Former, Roto Former, Inver Former, or Ventl Former may be used, in which a head box first deposits the slurry onto a moving wire screen. A vacuum or similar suction device removes the water that produces the veil. Conventional ovens perform the fusing and drying steps. As is described above, the irregularly shaped fibers 108 allow a more uniform volume filling than is found in straight fiber mats. Further, the irregularly shaped fibers 108 require less binder material, thus allowing easy flow.

An alternative process used for producing the veil 106 involves first preparing the slurry as described above. Next, the slurry is dewatered to form the wet-laid nonwoven mat. A secondary water-based binder is applied to the wet laid mat, followed by a second dewatering step to remove excess water from the saturated mat. Finally, the mat is placed in an oven to dry and cure the mat to form the finished nonwoven veil 106.

In yet another alternative process, the dried fiber mat may be rolled up prior to the introduction of the secondary water-based binder. The mat is then unrolled at a later time in a separate off-line process to introduce the secondary water-based binder that leads to the finished nonwoven veil 106.

Preferably, the veil is made using a binder that is highly soluble in the monomers provided in the paste, which is typically styrene. Preferably, the such a highly soluble binder has a solubility of over about 35%, more preferably over 50%, more preferably over 75%, and even up to nearly 100%. A preferred method to determine solubility comprises a determination of the amount of sizing that dissolves in acetone using a reflow method using Sohxlet distillation equipment. Such a reflow method preferably comprises a Soxhlet extraction method using 5 consecutive distillations, typically using acetone or styrene for solvent. In this method, a veil coupon is prepared and weighed. A predetermined amount of solvent is distilled in the apparatus and drips over a coupon of the veil to dissolve the binder. The dripped solvent is distilled and this is repeated four times. The veil weight is measured after five drippings, and a burn test is conducted on the veil to determine the residual amount of binder. The ratio of binder is then determined to establish solubility in the solvent. Such a preferred binder will substantially dissolve when the veil is wet out in the paste of the composite sheet, and the remaining fibers will be held within the composite sheet in substantially a sheet form due to the frictional engagement of the fibers and the viscosity of the paste. When such a composite sheet is compression molded, the fibers will straighten out (if not already straight) and slide relatively while the paste flows in the mold. The viscous paste will pull the fibers and cause the fibers to flow substantially in the plane of the mold surface. Frictional engagement between the fibers and the paste viscosity will encourage relatively uniform flow of the veil filaments without leaving holes or tears, and therefore the veil filaments remain in a substantially continuous layer after molding.

Figure 4:
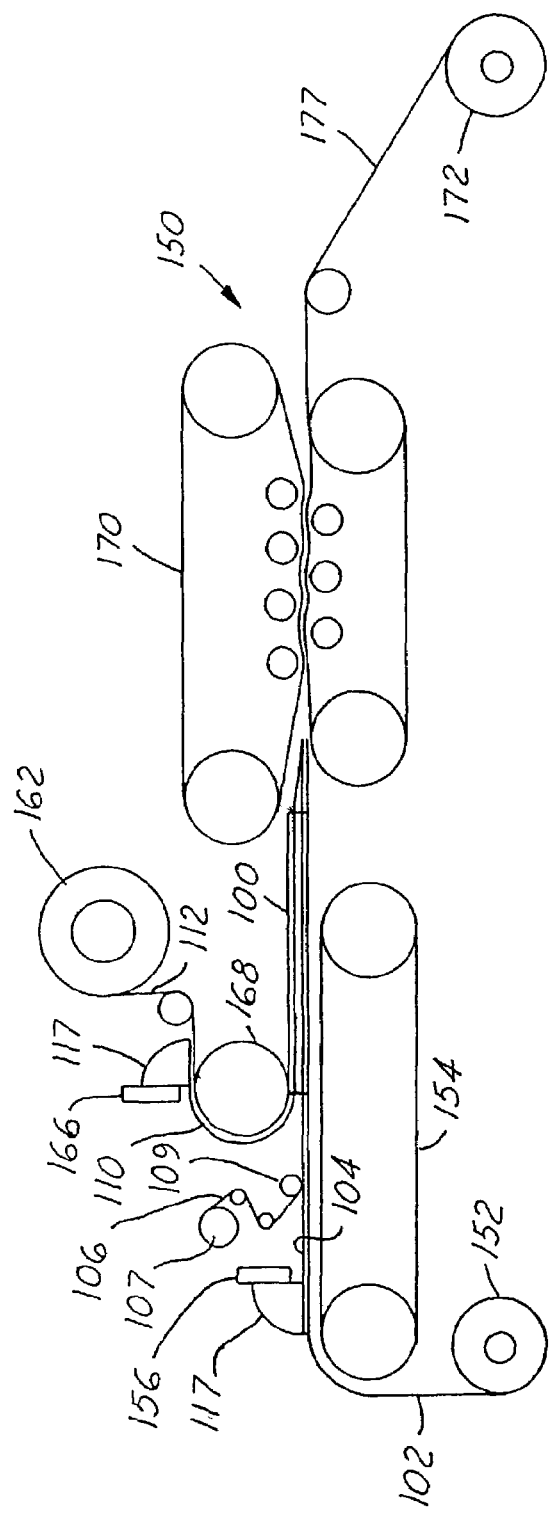
FIG. 4 is a schematic diagram for making the sheet molding compound of FIG. 1.

Accordingly, the present invention preferably provides a veil which flows relatively uniformly in all directions to ensure substantially uniform distribution of the veil fibers across the part, as the barrier layer including the paste and veil fibers flow in the mold. As described in more detail below, the present invention further ensures that the veil fibers do not relatively separate to form a hole (or "tear") in the veil, and therefore the veil comprises a continuous veil even after molding, and maintains a reasonably consistent thickness across the part. Accordingly, the veil must have elongation in both the length and width thereof, and if the fibers do not have sufficient length to maintain frictional engagement during flow of the combined paste and veil, the fibers may separate and result in holes (or apparent tears) in the veil. Additionally, the irregular shape and/or bends or out-of-plane position of fibers (relative to the horizontal plane of the veil) will contribute to the ability of the veil to apparently stretch or flow. As appreciated by one skilled in the art, the veil will substantially cover the entire surface of the mold adjacent the Class A surface of the molded part, and therefore keep the barrier layer intact, and prevent and underlying reinforcement fibers (bundles) and/or gases from appearing at the surface. Additionally, during (and after) molding, the resin in the paste will form a thin resin-rich layer at the external (Class A) surface of the part on the mold surface and none (or very few) of the veil filaments or reinforcing fibers will be visible under this thin resin rich layer. Preferably the thin resin-rich layer has a thickness of only one to three filament diameters. FIGS. 4–6 illustrate preferred processes for making the new sheet molding compounds of FIGS. 1–3, respectively.

Referring now to FIGS. 4 and 6, the assembly process 150 begins by unrolling the first carrier film layer 102 from a roll or reel 152 and transporting it across a carrier belt 154. Of course, in other embodiments, the carrier belt 154 is not necessary where the tensile strength of the first carrier film layer 102 is sufficiently strong to hold the entire sheet molding compound sheet 100. A first layer of paste 104 is dispensed onto the first carrier film layer 102 to a thickness of between 1.27 and 3.0 mm (0.05 and 0.12 inches) thick from a traditional dispensing device 117 as a wet resin and metered using a doctor blade 156, generally an upside down weir blade. The mat, or veil 106, or similar mat-like material is unrolled from a mat roll 107 through a series of tensioning rollers 109 onto the first layer of resin paste 104. Alternatively, although not illustrated, the paste 104 may be deposited on top of the veil 106 using an applicator such as the extruder or a doctor blade, and the paste covered veil is then laid on top of the carrier 102 and is processed as described herein.

As shown in FIG. 4, the second carrier film layer 112 is unrolled from a roll or reel 162 and the paste layer 110 is introduced from another traditional dispensing device 117 onto the inner side of the second carrier film layer 112. The second layer of paste 110 is metered at a thickness between 1.27 and 3.0 mm (0.05 and 0.12 inches) thick. The thickness of the paste layer 110 is controlled using a doctor blade 166. The second carrier film layer 112 and paste layer 110 is then rolled around a roller 168 and laid on top of the veil 106 such that the paste layer 110 is below the second carrier film layer 112. This forms the sheet molding compound sheet 100 shown in FIG. 1. Alternatively, as shown in FIG. 6, the second carrier film layer 112 is unrolled and laid onto the veil 106 without the introduction of the second paste layer 110 to form the uncompacted sheet molding compound sheet 100.

In another alternative embodiment, as shown in FIG. 5, partially filamentized or unfilamentized fiber 158 is chopped using a chopper 160 onto the veil 106 prior to the addition of the second paste layer 110.

As shown in FIGS. 4–6, a wire mesh belt 170 compacts the sheet molding compound sheet 100 to form a respective compacted sheet molding compound sheet 177 of a desired sheet weight that is then rolled onto a take up roll 172. By controlling the amount of paste deposited by the respective doctor blades 166, 156, by a simple gap adjustment, one skilled in the art can control the overall compacted sheet 177 weight. Alternatively, the sheet 177 could be festooned into a collection container (not shown) in a method well known to those of skill in the art.

Each batch of compacted sheet molding compound sheet 177 is then allowed to mature and thicken thereby increasing viscosity at either room temperature or at approximately thirty-two degrees Celsius for approximately one to fourteen days prior to any molding application. The batch may then be further processed by cutting the sheet molding compound sheet 177 to an appropriate ply or laminate size, removing the first and second carrier film layers 102, 112, molding the remaining material to an appropriate shape in a heated matched metal or composite die, and curing it under heat and pressure to make a finished composite part (not shown). Preferably, the curing step is done at approximately 5–10 MPa (750–1500 psi) at about 140–163 degrees Celsius for about one-half to three minutes. Of course, one of skill in the art would recognize that the curing conditions for the composite part may vary greatly depending upon such factors as part size and part geometry.

Figure 7:
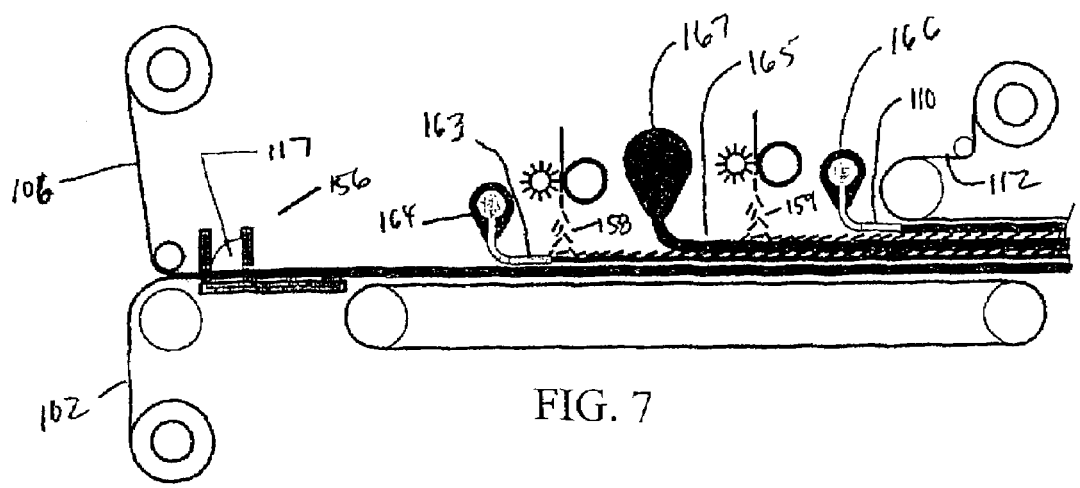
FIGS. 7–9 are alternate schematic diagrams for making sheet molded compound according to the present invention.
Figure 8:
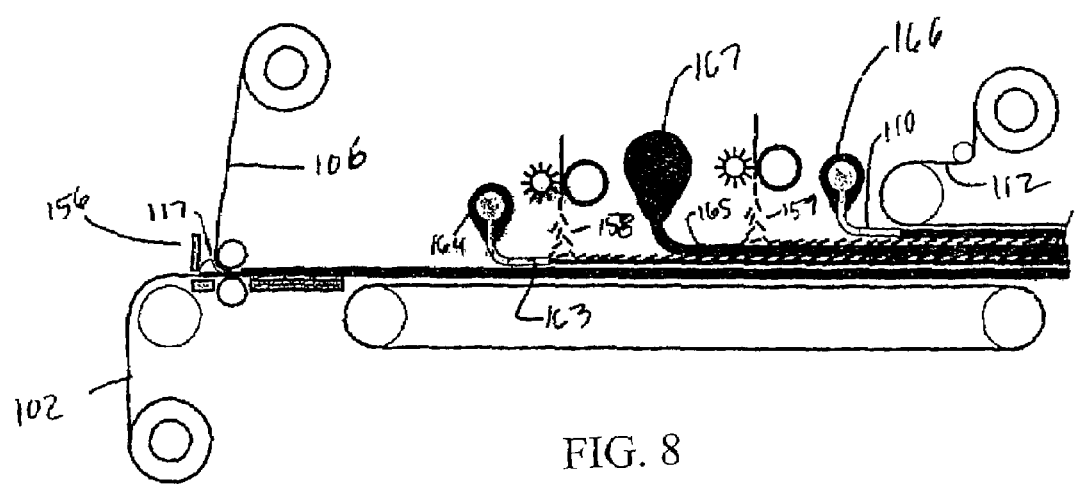
Figure 9:
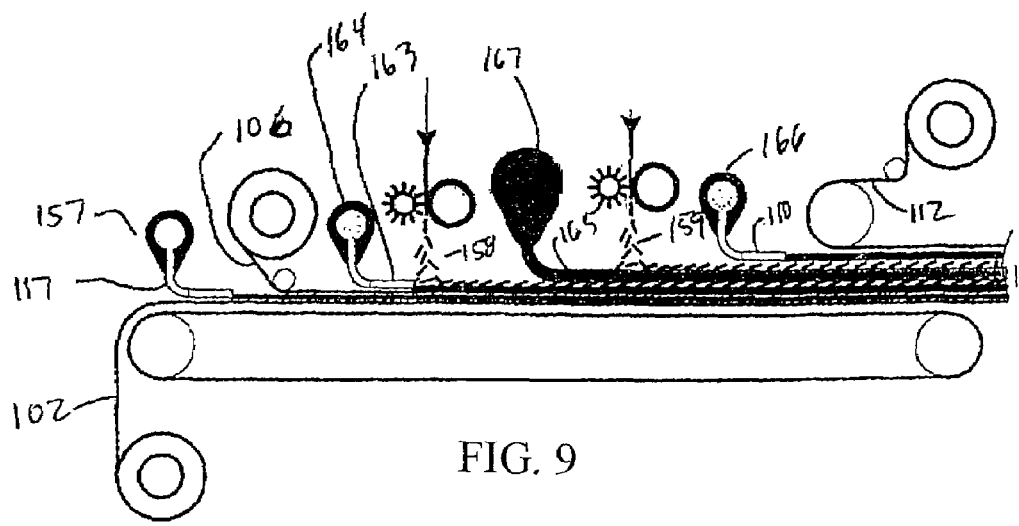

As is further shown in FIGS. 7–9, additional methods for forming a composite sheet are shown. As the process is similar to that described above with reference to FIGS. 4 and 5, the significant differences are described with reference to FIGS. 7–9, and similar elements use the same reference numbers. As shown in FIG. 7, a first carrier film 102 passes under a device to provide a first paste layer 104, either using a doctor box 156 as shown in FIG. 7, or a calendering device 155, as shown in FIG. 8, or a paste extruder 157 as shown in FIG. 9, or a funnel device 17B as shown in FIG. 14. A veil 106 is applied either under the paste layer 104 as shown in FIG. 7, or on top of the paste layer 104, as shown in FIGS. 8 and 9. As shown in FIG. 7, the blade of the doctor box 156 meters a thickness of paste on top of the veil, while the paste 117 in FIGS. 8 and 9 is metered under the veil. In the embodiment shown in FIG. 7, the paste 117 is forced though the veil to wet out the veil and form the resin-rich barrier layer while the sheet is being formed. The calendering device 155 of FIG. 8 includes a pair of squeeze rolls, which meter the amount of resin applied to the carrier film 102 (or veil) and enable a thin layer of paste to be applied and carefully metered between the squeeze rolls. The squeeze rolls force trapped gases to escape from the paste and create a relatively uniform layer of paste across the width of the veil, and force the paste to wet out the veil. Because the gases are squeezed out, a degassing device may not be required with the calendering device. Because the paste layer may be more precisely applied and will be forced by the rollers to wet out the veil, it is only necessary to apply enough paste to wet out the veil and to maintain an adequate resin-rich layer after molding. Accordingly, the present invention more economically allows a top layer which includes more expensive resin and/or additives, such as coloration dyes, UV stabilizers and such, since the amount of material used will be minimized. Additionally, FIGS. 7–9 provide a second paste layer 163 applied by a second device 164, which is preferably a paste extruder as shown in the figures, but which could alternatively comprise a funnel device as described herein.

A layer of chopped glass 158 is applied on top of the second paste layer 163, or alternatively a mat or veil could be applied at this stage. As shown in FIGS. 7–9, an optional third layer 165 of paste is applied with a third device 167, preferably a paste extruder, or other device as described above, and an optional second layer of chopped glass 159 is applied on top of the third layer 165 of paste. As noted above, this second layer of chopped glass could comprise a mat or veil. Additional alternating pairs of layers of paste and reinforcement (such as chopped fibers and/or mat) could be applied to achieve a desired thickness for the sheet, but for sake of clarity these FIGS. 7–9 illustrate two layers of chopped fibers 158, 159. Finally, a top layer 110 of paste is applied by a device 166 between the top layer of glass 159 and the top layer of film 112. Although a paste extruder is illustrated applying the paste 110 to the glass 159, one could use the extruder to apply the paste 110 to the film 112 in a manner similar to that illustrated in FIG. 4, or use a doctor blade 166 as illustrated in FIG. 4. The sheet is then preferably compacted as described above, but not shown in FIGS. 7–9.

Figure 10:
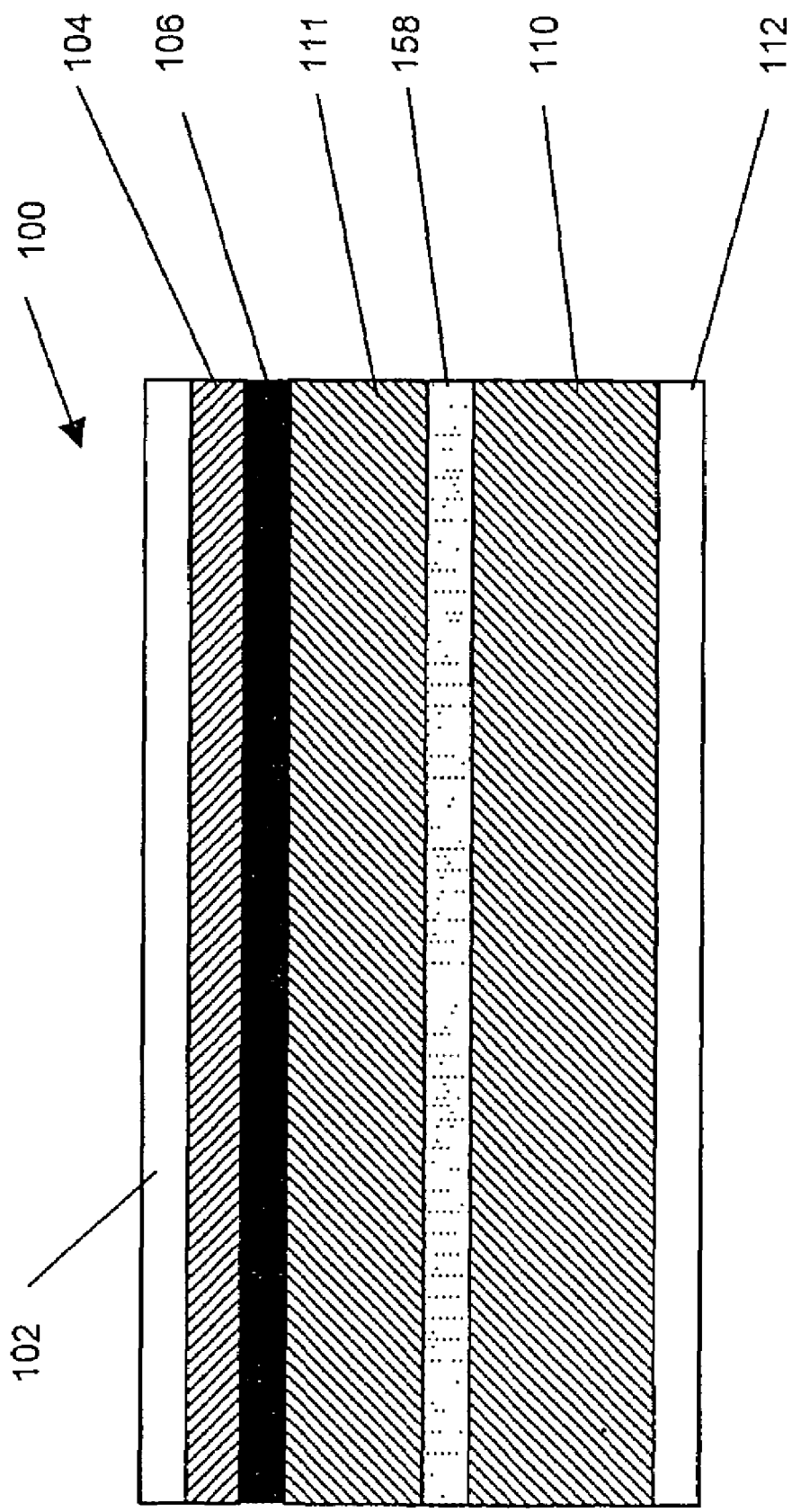
FIG. 10 is a perspective view of a sheet molding compound having improved surface characteristics according to a preferred embodiment of the present invention.

Accordingly, as shown in FIG. 10, in this embodiment, the sheet 100 comprises a first film layer 102 on top of the first paste layer 104. The first paste layer 104 comprises a Class A paste, and comprises the barrier layer as described above. A veil 106 having elongation in both its length and width is applied on top of the first paste layer 104. A paste layer 111 is provided on top of the veil 106. The first paste layer 104 and/or third paste layer 111 would preferably wet out the veil 106 when compacted. A second carrier film 112 is provided on the side of the sheet 100. A second paste layer 110 is preferably provided on the second carrier sheet 112. A layer of reinforcement 158, such as chopped glass, synthetic fibers, mat, veil, or other reinforcing material is provided between the second and third paste layers 110, 111. The second and third layers 110, 111 of resin wet out the layer of reinforcement during compaction. Because the first paste layer provides the barrier layer note above, the remaining paste layers could comprise a lower-cost paste, or a paste having differing properties than the Class-A paste of the top layer. As noted above, the sheet thickness could be modified to any desired thickness by adding additional pairs of layers of reinforcement materials and paste as taught by this disclosure.

The composite parts formed according to the present invention form the sheets 177 display superior surface characteristics as compared with traditionally formed sheet molding compound composite parts. This is attributed to the barrier layer formed by the first paste layer, and the barrier layer is supported by the veil as noted above. Because the sheet flows during compression molding, the veil of the present invention must elongate to accommodate the flow of the paste without tearing, as described in further detail herein. Accordingly, a preferred veil includes long fibers and/or irregularly shaped fibers and/or randomly orientated continuous fibers or filaments. Long fibers are preferably over 50 mm long, and more preferably over 100 mm long, but preferably less than 1000 mm, and more preferably between 100 mm and 300 mm, but in some applications the long fibers may be longer than 1000 mm, and may include lengths of continuous fibers.

The mat may be formed using a wet or dry process, and may be needled or unneedled, depending on the mat weight and mechanical properties desired. Needling has been found to improve the stretching capabilities of the veil in a process according to the present invention. Irregularly shaped fibers provide loft and softness of the fibers 108. In a preferred embodiment the veil fibers (whether irregularly shaped or otherwise) comprise fine filamentized fibers versus coarse bundles of fibers, wherein the fibers 108 flow on top of and with the sheet molding paste from the paste layers 104, 110 under pressure. The fibers may comprise glass fibers, organic fibers, carbon fibers, natural fibers, synthetic fibers, or any combination thereof. A preferred dry process to manufacture the veil includes utilizing a known dry mat process using continuous filaments, but further includes needling operation to break the fibers into lengths of long fibers about 100–200 mm long, and which adds a vertical dimension to the fibers to improve properties of the veil.

The veil 106 can be made in various mat sheet weights that will permit it to be used in various applications where either heavier or lighter mat weight is required for surface enhancement. The use of the veil 106 having the irregularly shaped fibers 108 allows for the use of a binder fiber at a low LOI to form the veil 106, which contributes to ease of flow in press molding. As appreciated by one skilled in the art, LOI is the loss on ignition, or also referred as solid content, and is determined by a bum test. The percentage weight lost on ignition gives a crude measure of the organic content of the sample. Preferably the binder is present in an amount of between four and twenty percent. One skilled in the art appreciates that a method to make a composite sheet according to the present invention could utilize either the first carrier film or the second carrier film, or both, to carry the barrier layer of paste, then a veil is applied above the paste layer as described above. A preferred veil has adequate tensile strength in both the machine direction and transverse direction to improve processing during the process to make the sheet, especially as the veil passes under the doctor box 156 as shown in FIG. 7, and may help avoid tears or holes when the composite sheet is compression molded. Preferably the veil has a tensile strength of at between about 5 and 250 Newtons per meter width in the machine direction, and between about 5 and 50 N/m in the transverse direction. More preferably, the veil, as received and prior to wet-out (i.e. "dry"), has a strength of over 50 N/m and even more preferably over 200 N/m in its length, so the veil remains intact when passing under the doctor blade as shown in FIG. 6. Therefore, the veil will have a tensile strength in each direction of preferably at least between 5 and 50 N/m, and more preferably at least 10 N/m in each direction, and more preferably over 50 N/m in its length and over 10 N/m in its width.

While the above example indicates only one ply of sheet molding compound sheet 100, it is understood that more than one ply is typically used to form a composite part. The number of plies of the sheet molding compound sheet 100 used to form the composite part varies as a function of the thickness of the composite part desired, but typically ranges from two to four plies. As is known to one skilled in the art and therefore not described in great detail herein, plies are positioned in a mold within a compression molding machine. The mold is then closed upon the plies, and due to the pressure, the plies elongate in length and width as the paste flows within the mold to cover the surface of the mold and fill the tool cavity. A veil according to the present invention elongates in both length and width without tearing as the paste flows, so as to cover the surface of the mold adjacent a resin-rich layer at the surface of the part formed within the mold. Preferably, the veil has an elongation between about 5 and 50 percent in both directions. More preferably, the veil is capable of at least five percent (5%) elongation in each direction (length and width), and more preferably at least 10% elongation in both directions, and more preferably at least 30% elongation in at least one direction, and more preferably at least 30% elongation in both directions, or 40% elongation in at least one direction and at least five percent, and preferably more, in the second direction. In molded parts having deeper draws, the veil preferably has at least 20 to 30 percent elongation in the direction of flow. The veil may be specified according to the amount of flow and/or draw required to make the part, and the required elongation required in a particular direction may be specified accordingly. Even more preferably, the veil has a wet elongation of up to 100% or more in each direction due to the solubility of the binder and movement of the filaments as described above.

In a preferred embodiment, a top ply of the sheet molding compound sheet 100 and one or more sheets of sheet molding compound made according to the prior art are placed in the mold. After proper molding and curing, this forms a composite part having a Class A surface side on a visible side of the composite part and a non-Class A surface that is usually found on the non-visible side. If both the top and bottom surface of the composite part formed need Class A surfaces, then a top ply and bottom ply of the sheet molding compound sheet 100 may be used, with one or more sheets of sheet molding compound made according to the prior art contained within these sheets 100 (some of which may include a paste that is not considered to be a Class A paste). In the case of use of the composite sheet 100 of FIG. 2, the veil 106 should be located closer to a visible surface of the composite part than the fibers 158. Additionally, the present invention provides the capability to provide a colored barrier layer, thereby permitting parts to be molded in color, without the entire composite sheet being colored, and is preferably UV resistant, so as to retain the molded color.

In addition, many modifications that can be made to specific components of the sheet molding compound sheet 100 are specifically contemplated. For example, the resin composition of the paste layer 104 of the top ply of the sheet 100 may be altered to utilize other resins, including modified epoxies, vinylesters, acrylics, or urethane-modified polyester resins, that have better impact/toughness properties. Alternatively, as described in U.S. Pat. No. 6,020,443 to Woodson et al., which is herein incorporated by reference, the top ply of the composite sheet 100 may be altered by using a dicyclopentadiene resin (DCPD) using ring opening metathesis polymerization ("ROMP") and a ruthenium, osmium or iron-based catalyst. To reduce composite part density, a portion of the filler may be replaced with a special clay or treated filler that improves wetting, while at the same time increasing the viscosity of the paste prior to application. This provides sufficient viscosity so the compound carries the reinforcement as it flows within the tool, thereby maintaining substantially consistent glass loading across the molded part. By reducing the amount of filler necessary to achieve the viscosity, the volume fraction of the resin within the compound may be increased. This increase in volume fraction of a constituent with a lower specific gravity may result in a part with lower weight. However, additional reinforcement material may be needed to control the coefficient of linear thermal expansion ("CLTE") and stiffness of the composite part as the volume fraction of the filler is decreased.

Also, milled fibers, carbon/graphite fiber strands, carbon/graphite powder, carbon/graphite flakes, or short fiber strands (8 mm or less) may be mixed into the paste 104, 110 to help modulus or CLTE. Two preferred grades of graphite available from Superior Graphite Company include Grade 2139 natural flakes and Grade 5039 synthetic flakes. In the case of graphite powder or flakes, the powder or flakes comprise at least 5 weight percent, and preferably between approximately 20 and 35 weight percent, of the paste 104, 110 formulation in order to achieve sufficient conductivity to be electrostatically painted. The addition of graphite powder or flakes in place of or in addition to carbon or glass fiber lowers the specific gravity of the resin paste 104, 110, which thus results in lighter weight molded compounds. As such, fillers such as calcium carbonate are typically added in addition to the graphite flakes or powders to maintain the specific gravity in a preferred range and additionally to lower cost. Further, as described in U.S. Pat. No. 5.965,470 to Bening, which is herein incorporated by reference, carbon microfibers, or fibrils, may be added to the paste layers 104, 110 to improve CLTE, conductivity, paintability and surface quality.

Also, a portion of the irregularly shaped fibers 108 may be replaced with a conductive material or combination of conductive materials such as carbon fibers, flakes, fibrils or powders as described above within the veil 106. When compression molded, the irregularly shaped fibers 108 straighten as described above during flow. The conductive materials, meanwhile, are maintained in a substantially continuous network, thereby maintaining the conductivity within the composite material. This produces an electrostatically sprayable composite part made of sheet molding compound sheet 100 that has improved surface characteristics as described above. Alternatively, an aluminum or other conductive metallic substance may be used in place of conductive materials listed above to increase electrical or thermal conductivity. In a further alternative embodiment, the barrier layer comprises a paste having conductive filler materials, such as a graphite material to provide surface conductivity in finished composite parts (as described in further detail below).

In a further embodiment, a composite sheet is made according to the present invention with a veil on the top side as described above, and a second veil is applied to the backside of the part. The backside then could have Class A characteristics, which is not commonly needed, or the veil will impart improved properties, including a reduction of warpage of the part. One skilled in the art appreciates that a preferred process to make such a sheet, although not illustrated, involves applying a paste layer to each of the carrier sheets, providing a veil on top of each paste layer, and preferably placing an intermediate layer of resin adjacent each veil and a layer of reinforcing material between the intermediate layers of resin. Alternatively, the second veil may comprise the reinforcing material and one layer of paste would be provided between the veils.

Composite parts having at least one layer of sheet molding compound sheet 100 according to the present invention have many advantages over the prior art sheet molding compound layered composite parts. First, the present invention reduces the propensity of the SMC composite part to exhibit paint pops by having a more resin rich paste 104, 110 with a barrier veil 106, to keep glass bundles in the part without breaching the top surface layer. This thereby reduces rework of composite parts, which decreases costs and waste. The composite parts having a top ply of sheet molding compound sheet 100 flow well enough to form a reasonably constant skin. When conductive materials as described above are added, a composite part having good electrostatic sprayability is formed which allows the use of powder coatings or electrostatic sprayers. The composite parts may also have improved thermal conductivity as well, thereby reducing the risk of surface imperfections associated with thermal conductivity such as blistering, warping or pops. Finally, the present invention produces composite parts having a Class A type surface.

Using the current invention, a composite part may be molded using a charge that covers a larger portion of the tool than is commonly used, and create a substantially wave-free surface. For example, a typical charge would cover 40 percent of the tool and during compression, the charge would flow to cover the entire tool. Using the current invention, a tool coverage of 60 percent, 70 percent, 80 percent, and greater have been tested successfully, due to the presence of the veil and barrier layer. Further improvement is achieved with the present invention when the molded charge is made from a single "thick" sheet to form the charge as enabled by this invention. Accordingly, the thickness of the veil that ultimately defines the thickness of the barrier layer must be adjusted to provide a good layer of resin and veil when the composite sheet flows during molding. When selecting the thickness of the veil, one must take into account the veil areal weight, density, fiber diameter and tool coverage, and target results in a thickness of at least about 0.1 mm over the entire molded part. Preferably, with a veil having filaments of 100 mm length, diameter of 15 micrometer, for a tool coverage of 60%, a veil weight of about 120 grams/sq. meter has been found to be satisfactory. Applicants have found that a veil weight of 40 to 120 gr/m$^2$ may be used in most applications, and a weight of between about 20 grams/square meter and about 200 grams/square meter may be useful in some applications.

Referring now to FIG. 11, a single ply of a electrically conductive sheet molding composite (SMC) sheet 10 used to make an electrically conductive sheet molding compound (shown as 77 in FIG. 12) made in accordance with another preferred embodiment of the present invention is generally shown as 10 prior to compaction. The sheet 10, from top to bottom, is similar to that described above with reference to FIG. 1, but replacing the veil 106 with chopped fibers 16. The description in FIGS. 11–13 focuses on the conductive fibers, and therefore the veil is not discussed in the following paragraphs. However, one skilled in the art appreciates that this discussion is directly applicable for FIGS. 1–10, wherein the conductive paste is applied with the veil, as described above.

In FIG. 11, a second carrier film layer 12, a top paste layer 14, a plurality of chopped reinforcing fibers 16, a conductive paste layer 18 and a first carrier film layer 20 are provided in layered form. Of course, the order of the layering from top to bottom for the sheet molding composite sheet 10 may be reversed. The process for forming the SMC sheet 10 of FIG. 11 is shown in FIG. 12, and is similar to that shown in FIG. 4, but replaces the mat with the chopped fibers. Preferably, the chopped reinforcing fiber 16 is be selected from fibrous materials that are commonly known in the art, such as glass, carbon, natural fibers, polymers and other fiberizable materials known in the art, or mixtures thereof.

The composition of the paste containing layer 14 used in FIG. 11 of the present invention is preferably a variation to formulations currently used for molding Class A surface and/or structural parts as noted above. In addition to a polyester resin (which may include the thermoplastic, thermoset, reactive monomer, etc. as known to one skilled in the art), the formulation contains fillers such as calcium carbonate, a resin inhibitor and initiator (catalyst), an alkaline earth oxide or urethane thickening agent, and an internal mold release agent. Of course, other additives may be added depending upon the desired characteristics of the paste and finished composite part.

The conductive paste layer 18 is preferably similar in formulation to paste layer 14, but further comprises a graphite material 23 that is used to provide surface conductivity in finished composite parts (shown as 114 in FIG. 13). Two preferred grades of the graphite material 23 include graphite flake and synthetic graphite powder. As shown in Table 2, a preferred graphite flake is Grade 2139 synthetic graphite flake and a preferred graphite powder is Grade 5039 synthetic graphite powder, both available from Superior Graphite Company. The preferred particle size and morphology of the graphite material 23 may vary, but is preferably less than 30 micrometers. Test results have shown that an electrical conductivity of less than $10^6$ ohms per square along a visible surface of a finished composite part 114 made from at least one ply of the conductive sheet molding compound 77 is necessary for electrostatic sprayability. To ensure this electrostatic sprayability, a concentration of at least 15 weight percent of the graphite material 23 in the formulation of the conductive paste layer 18 is necessary.

TABLE 2

GRAPHITE MATERIAL 23

| DESCRIPTION | GRADE | MANUFACTURER |
|---|---|---|
| Natural Flake Graphite | 2139 | Superior Graphite Co. |
| Synthetic Graphite | 5039 | Superior Graphite Co. |

A preferred composition for the paste layer 14 and the conductive paste layer 18 are shown above in Table 1, and below in Table 3, respectively.

TABLE 3

CONDUCTIVE PASTE LAYER 18

| INGRE-DIENTS | WEIGHT (GRAMS) | WEIGHT % | MANU-FACTURER | DESCRIPTION |
|---|---|---|---|---|
| T341 | 2953 | 21.82 | AOC/Alpha Owens Corning | Thermosetting Polyester Resin in styrene |
| T154 | 2290 | 16.92 | AOC/Alpha Owens Corning | Thermoplastic Polyester resin in styrene |
| Styrene | 545 | 4.03 | Ashland | Styrene monomer |
| DVB | 232 | 1.71 | Dow | Divinyl benzene |
| P710 | 154 | 1.14 | BASF | Polypropylene oxide |
| PBQ | 1.54 | .01 | Aldrich | P-benzoquinone |
| CBA-60 | 154 | 1.14 | Witco | Non-ionic surfactant |
| 1300 × 40 | 103 | .76 | B. F. Goodrich | Hycar Rubber in styrene |
| TBPB | 93 | .69 | Atofina | T-butyl perbenzoate catalyst |
| Calcium Stearate | 206 | 1.52 | Mallinckrodt | Mold Release Agent |
| 2139 grade natural flake | 2850 | 21.06 | Superior Graphite Co. | Graphite Flake |
| W-4 | 3500 | 25.86 | Huber | Calcium carbonate |
| RP 510 | 319 | 2.36 | AOC/Alpha Owens Corning | Thermoplastic polyester resin in Styrene |
| Zinc Stearate | 26 | .19 | Mallinckrodt | Mold release agent |
| PDI-1805 | 5 | .04 | Ferro | Iron pigment |
| Calcium Oxide | 93 | .69 | C. P. Hall | Alkaline earth oxide thickener |
| Water | 8 | .06 | | |

Some other advantages of using graphite material 23 in the conductive paste formulation layer 18 are the result of the ability of the graphite material 23 to serve as an inorganic additive or filler. Thus, addition of graphite material 23 often tends to increase the viscosity of the total sheet molding paste system. A useful molding viscosity may be maintained while the total amount of other additives, such as $CaCO_3$, calcium carbonate, may be reduced in the overall conductive paste formulation 18. Often, the graphite material 23 tends to be lighter in weight and exhibit a lower specific gravity when compared with other fillers, so the final weight of the parts 114 molded with the present invention may be lighter than conventional sheet molding composite parts.

Additionally, by substituting other inorganic fillers with a requisite amount of graphite material 23, an improvement in the coefficient of linear thermal expansion and coefficient of thermal expansion has been observed. This improvement may provide a surface layer on the subsequently molded composite part less likely to warp and may therefore exhibit improved surface quality.

Referring now to FIG. 12, one preferable assembly process is shown for making a compacted SMC compound 77 from the SMC sheet 10 of FIG. 11 is generally shown as 50. The assembly process begins by unrolling the first carrier film layer 20 from a roll or reel 52 and transporting it across a carrier belt 54. Of course, in other embodiments, the carrier belt 54 is not necessary where the tensile strength of the first carrier film 20 is sufficiently strong to hold the entire SMC sheet 10. The conductive paste layer 18 is then introduced onto the first carrier film layer 20 in the form of a wet paste 18' from a traditional dispensing device 17. The device 17 preferably meters the paste 18' using a doctor blade 56, generally an upside down weir blade. The device illustrated here is illustrated with an arcuate rear side opposite the doctor blade 56, but one skilled in the art appreciates a rectangular doctor box may be used as well.

Reinforcing fiber 16 in the form of filamentized or unfilamentized fiber is then chopped, using a chopper 60, onto the conductive paste layer 18. A second carrier film layer 12 is unrolled from a roll or reel 62 and a paste layer 14 is deposited onto the second carrier film 12 using another traditional dispensing device 17. The paste layer 14 is deposited as a wet paste 14' onto the inner side of the second carrier film 12. The thickness of the paste layer 14 is controlled using a doctor blade 66. The second carrier film layer 12 and paste layer 14 is then rolled around a roller 68 and laid on top of the chopped reinforcing fiber 16 such that the paste layer 14 is below the second carrier film layer 12. This forms the conductive SMC sheet 10 shown in FIG. 12. A wire mesh belt 70 compacts the conductive SMC sheet 10 to form a compacted conductive SMC compound 77 of a desired area weight prior to rolling onto a take up roll 72. During the compaction step, excess paste from the paste layer 14 and conductive paste layer 18 penetrates within and through the chopped reinforcing fibers 16. By controlling the amount of pastes 14' and 18' deposited by the respective doctor blades 66, 56, by a simple gap adjustment, one skilled in the art can control both the overall compacted compound 77 weight and the percentage of filamentized reinforcement material that is contained within each compacted composite compound 77.

Each batch of compacted conductive SMC compound 77 is then allowed to mature and thicken thereby increasing viscosity at approximately thirty-two degrees Celsius for approximately one to fourteen days prior to any molding application. The batch may then be further processed by cutting the SMC compound 77 to an appropriate ply or laminate size, removing the second and first carrier films 12, 20, molding the remaining material to an appropriate shape in a heated matched metal or composite die, and curing it under heat and pressure to make a finished composite part (such as 114 in FIG. 13). Preferably, the curing step is done at approximately 5–10 MPa (750–1500 psi) at about 140–163 degrees Celsius (280–325 Degrees Fahrenheit) for about one-half to three minutes.

In a preferred embodiment, as shown in FIG. 13, a top ply 102 of the conductive SMC compound 77 and one or more plies 104 of conventional SMC made according to the prior art are placed in a mold 112. The mold 112 is closed and the plies 102, 104 are compressed and consolidated under heat and pressure by conventional methods to form a composite part 114 having a conductive surface on a top visible surface 116. If both the top visible 116 and bottom visible surface 118 of the composite part 114 formed need conductive surfaces, then a top ply 102 and bottom ply 102A of the compacted conductive SMC compound 77 may be used, with one or more plies 104 of sheet molding compound made according to the prior art contained between these plies 102, 102A of the conductive SMC compound 77.

In an alternative embodiment, as shown in FIG. 14, a funnel-shaped dispensing device 17B replaces one or more of the traditional dispensing devices shown in the other FIGS. 4, 5, 6, 7–9 and 12, e.g. the doctor blade 56 shown in FIG. 12. In one embodiment, all of the conventional devices comprise such funnel-shaped devices, although not illustrated as such. The funnel-shaped dispensing device 17B helps to prevent the entrapment of air that is common in traditional dispensing devices such as a doctor blade 56. To control viscosity in the dispensing device 17B, heat or cooling may be applied to the device 17B to maintain a constant temperature, and thereby better enable and control the viscosity and flow therefrom. Heat may be applied to the device 17B near the exit 22 of the device 17B to decrease the viscosity of the paste 18' and thereby improve wet-out of the glass fibers or mat within the sheet 10. In this regard, the heat source (not shown) could be applied against or within a wall 24 of the device 17B near the exit 22 or by using the dividing plate 23 as a heat source within the vertical feeding slot 21. Alternatively, a volumetric paste extrusion device may be employed as is described herein.

The output of the funnel device 17B is controlled by controlling the viscosity of the paste 18' through composition and temperature, plus controlling the pressure within the feeding slot 21, which may be accomplished by controlling the height of the paste in the device 17B, and may include an optional pressurization of the device 17B through known mechanical means (not shown). Accordingly, by controlling the pressure, underfeeding and overfeeding of the doctor blade may be avoided, thereby avoiding too thin, or too thick application (or a mess), respectively. Further, one skilled in the art appreciates that more than one funnel may be provided in series, and accordingly more than one type of paste may be deposited onto the sheet; for example, the first funnel may include a non-filamentized paste to provide a resin rich layer on the outside of the part, and a filamentized paste may be deposited by a second funnel adjacent the nonfilamentized paste.

As shown in FIG. 2B, the new funnel-shaped dispensing device 17B is preferably attached to a conventional doctor box, and more preferably the lip of a conventional doctor blade, as shown in FIG. 2A. The height of the paste 18' is controlled via a float valve or similar device so one does not overfeed the doctor blade 56 and force excessive paste underneath the blade 56. The device 17B contains a foot 19 that extends out into the main dispensing area that ensures that the film layer 20 does not catch when the machine is in operation. The foot 19 is adjusted to have a small gap between it and the film layer 20 that is sufficient to prevent the paste 18' from flowing out the back of the dispensing device 17B. Further, the dispensing device 17B has a vertical feeding slot 21, which is preferably divided into two or more narrower slots 21' by one or more dividing plates 23, each such slot 21, 21' forming a column of paste. The first such slot 21' nearest the foot 19 first contacts the carrier film 20. In the event that the paste deposited from the first such slot 21' includes air bubbles or incompletely coats the film 20, each subsequent slot 21' will help to coat over any imperfection in the paste from the preceding slots 21'. Thus, the multi-slotted funnel-shaped dispensing device 17B is engineered to reduce trapped air or voids within the paste 18', and to form a layer 18 with uniform weight and thickness. Preferably, the width of the slots 21 and 21' are adjustable by either installing fewer/additional, thinner/ thicker plates 23, and/or adjusting walls 24. In a preferred embodiment the foot 19 is positioned between about 0.03–0.25 inch above the film 20 (or a veil), and the tip of the doctor blade 56 is positioned between about 0.05–0.125 inches above the film 20, however these gaps will depend upon the paste composition, viscosity, and overall operating conditions.

Each batch of compacted SMC sheet 77 is then allowed to mature and thicken thereby increasing viscosity at approximately thirty-two degrees Celsius for approximately one to fourteen days prior to any molding application. The batch may then be further processed by cutting the SMC sheet 10 to an appropriate ply or laminate size, removing the upper and lower carrier films 12, 20, molding the remaining material to an appropriate shape in a heated matched metal or composite die, and curing it under heat and pressure to make a finished composite part (not shown). Preferably, the curing step is done at approximately 5–10 MPa (750–1500 psi) at about 140–163 degrees Celsius (280–325 Degrees F.) for about one-half to three minutes.

During the compaction step described above, excess resin from the paste layer 14 and paste layer 18 penetrates within and through the fiber layer 58 to wet it out. The compacted SMC sheet 77, when cured, forms a composite part in which visible surface layer forms a resin rich and nearly porous free layer that has improved surface characteristics with less surface pores as compared with traditional sheet molding compound composites.

In addition, if conductive materials such as carbon or nickel coated carbon or glass fibers are used in the fiber layer 18, a cured composite part having improved electrostatic sprayability characteristics may be realized. Such conductive fibers may be used in addition to, or instead of, glass fibers. Similarly conductive flakes, fibrils, powders, or carbon or nickel coated carbon or glass fibers or conductive particles may be used in the resin impregnated filamentized fiber layer, each of which is to be considered as conductive fibers for the purposes of this disclosure. Further, by concentrating the conductive materials within the fiber layer 18 at a location which is very close to the surface of the composite part, less conductive material is needed within the composite part as compared with traditional sheet molding compound composite parts having conductive material, which reduces raw material costs.

FIGS. 17 and 18 illustrate two preferred embodiments of a compounding line for making a new sheet molding composite sheet 271 that is subsequently processed to form a composite parts. In these embodiments, a volumetric pump is used to feed a slit extrusion die that stands over the compounding line. This use of this volumetric dosing system to apply the sheet molding paste is believed to offer numerous advantages over traditional sheet molding composite sheets made using doctor box application techniques.

Referring now to FIG. 17 a new compounding line 200 for making the sheet molding composite sheet 271 is illustrated. First, a lower carrier film 202 is unrolled from a creel 204. A quantity of sheet molding paste is volumetrically applied to the surface of the carrier film 202 to form a layer 206 using a volumetric paste extrusion device 208. The volumetric paste extrusion device 208 is illustrated in further detail below in FIGS. 19 and 20.

One preferred composition for sheet molding paste layer 206 is disclosed below in Table 1. However, other additives could be added to the composition, including demolding agents, low profile additives to reduce fiber prominence, anti-static additives, ultraviolet ("UV") light stabilizer additives, and other additives contemplated in the art to give desired surface characteristics for the composite part formed from the sheet molding compound 271.

Further, conductive materials could be added to sheet molding paste layer 206 to improve electrostatic sprayability. These include milled fibers, carbon/graphite fiber strands, graphite powder, graphite flakes, or short fiber strands (8 mm or less) to help modulus or CLTE.

Next, a layer of thin non-woven fabric, or veil 210, similar to that described above, is unrolled from a creel 212 or similar device and placed on top of the sheet molding paste layer 206. This veil 210 preferably is the kinked fiber veil as described in Provisional Application 60/328,620, filed Oct. 12, 2001, from which this application claims priority and which is herein incorporated by reference, or may include a veil having the characteristics described above.

Next, another layer 214 of resin paste is applied preferably using a second volumetric paste extrusion device 216. This layer 214 of resin paste is formulated to give excellent mechanical performance and proper shrink control. Because this is an internal resin layer, surface characteristic additives are not necessary in the composition of the resin paste layer 214 such as those shown in Table 1 above. Thus, antistatic additives, ultraviolet ("UV") light stabilizer additives and other additives contemplated in the art to give desired surface characteristics for the composite part are not needed. Thus, a preferred resin composition would be similar to that depicted in Table 1 without these additives.

Next, a layer of chopped glass fiber reinforcement 218 is added over the resin paste layer 214. This layer of chopped glass fiber reinforcement 218 is typical as to what is found in the prior art. A multi-end glass fiber roving 220 is fed into a chopper 222 to form the chopped glass fiber reinforcement 218. A third paste layer 224 is then added preferably using a third volumetric paste extrusion device 226. A second layer of chopped glass reinforcement 228 may then be added over the third paste layer 224.

The process for forming the rest of the sheet molding compound 250 is done by adding the components in reverse order of what has been done in the above paragraphs without the outer paste layer 206 and veil 210. Thus, another paste layer 214, and an outer carrier layer 202 are laid on top of the chopped glass reinforcement layer 228. Of course, if a class A surface is desired on both sides of the sheet molding compound 250, the extra layer of veil 210 and outer paste layer 206 may be incorporated between the resin paste layer 214 and outer carrier layer 202.

Finally, the sheet molding composite sheet 271 is formed by rolling or passing the sheet molding compound 250 through a compaction device 240 and packaged by winding around a mandrel 242 or other packaging device known in the art for later processing. Alternatively, the sheet molding composite sheet 271 could be festooned in a box. In addition, the sheet molding composite sheet 271 may be cut on the compounding line at regular intervals and the cut sheets placed flat in a storage container for later processing. The advantage in this process is that the sheet molding composite sheet 271 is not damaged due to bending, which can result in improved surface characteristics.

The sheet molding composite sheet 271 is then matured for 1 to 14 days, typically at approximately 29–46 degrees Celsius (85–115 degrees Fahrenheit) This allows the viscosity of the sheet 271 to increase enough so that the sheet molding paste and reinforcement material flow homogeneously together instead of separating in the subsequent molding process that form a composite part.

Alternatively, as depicted in FIG. 18, a bulk molding compound paste layer 230 may be introduced in place of the third paste layer 224 using a bulk molding volumetric paste extrusion device 244.

The bulk molding compound layer 230 is a specially formulated paste that is effective in incorporating with proper impregnation various kinds of fillers that can be sequentially incorporated into the paste. These fillers are added to the paste for a variety of reasons, including waste and weight reduction, and are not typically added to sheet molding compounds because they can create surface imperfections. Because these fillers are contained in a middle layer, they have little or no effect on surface characteristics. These fillers include low-density fillers and recycled materials of various granulometry and morphology.

Figure 20:
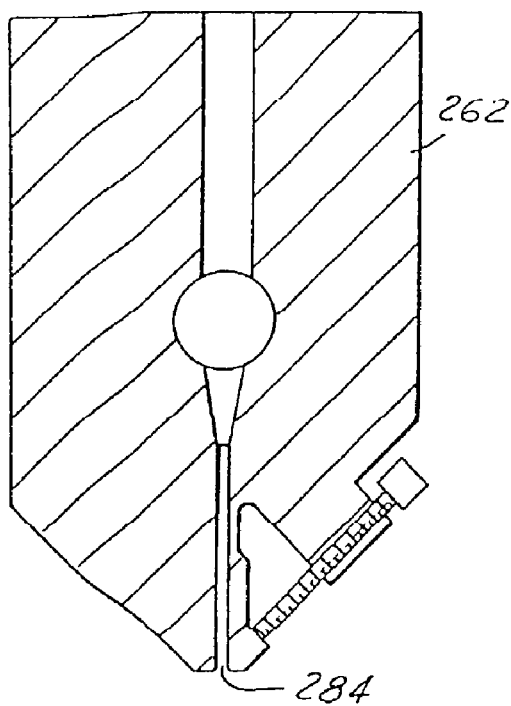
FIG. 20 is a side view of the slit extrusion die of FIG. 19.
Figure 22:
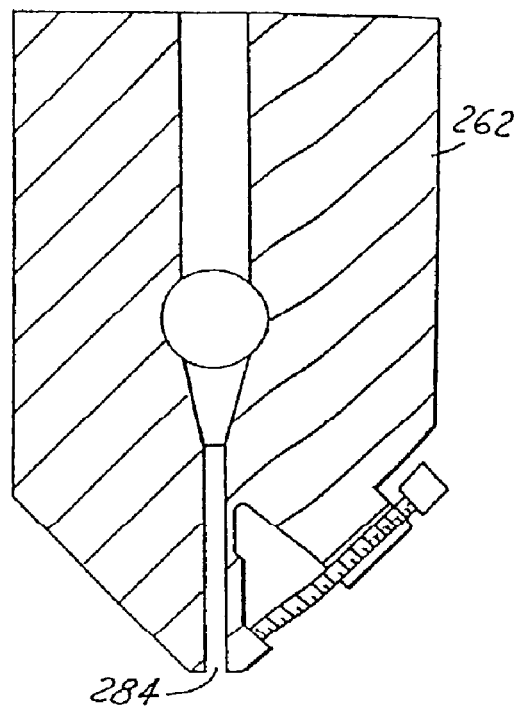
FIG. 22 is a side view of the bulk molding slit extrusion die of FIG. 21.

In FIGS. 19 and 21 shown below, a close-up view of the volumetric paste extrusion device 208, 216, 226 and the bulk molding volumetric paste extrusion device 244 are depicted. FIGS. 20 and 22 show a close up and side view of the slit extrusion dies of FIGS. 19 and 21, respectively.

Referring now to FIGS. 19 and 20, the volumetric paste extrusion device 208 consists of a paste tank 260 and an slit extrusion die 262 having an Archimedes screw motor drive 264 coupled together by a pair of lines 265, 267 each having a volumetric pump 266, 268. Of course, while volumetric paste extrusion device 208 is shown, the volumetric paste extrusion device 216 and 226 (in FIG. 17) have the same design and operation. In operation, the sheet molding paste 206 contained in the paste tank 260 is pumped from the tank 260 to the die 262 through line 265 by pump 266. A portion of the paste 206 exits the die 262 through slit 284 contained on the die 262 onto the conveyor belt 278, while the rest of the paste exits the die 262 through line 267 in a controlled manner by volumetric pump 268. The slit 284 is tapered from the inside to the outside and has a constant circular cross-section. A filter 274 is coupled to line 267 and prevents clumps or large fiber particles from returning to the paste tank 260. This filter 270 also prevents the plugging of the slit 284. The paste 206 is preferably kept under low vacuum pressure in the cylinder 260 to expel gas bubbles from to the paste while preventing boiling of solvents. The paste output through slit 284 result from the subtraction between the throughput of paste 206 through pump 266 and the throughput of paste 206 through pump 268.

The Archimedes screw device 264 has many functions. First, it allows for compensation in pressure drop along the die 262 in the throughput of paste 206 across the width W of the line 278. It also brings flexibility allowing the control of the left-right balance of paste 206 distribution along the entire width of the slit 284. This allows continuous cleaning of the slit 284 by moving clumps towards the filter 270. Particles that pass through the slit 284 will discharge on the line 278 given the tapered geometry of the slit 284.

Referring now to FIGS. 21 and 22, the bulk molding compound volumetric paste extrusion device 244 is shown. The bulk molding compound volumetric paste extrusion device 244 operates essentially in the same way as the extrusion device 208, 216, 226 of FIGS. 17, 19 and 20. The only differences between the devices 208, 216, 226 and device 244 are the type of resin paste used and the width of the slit 284 in the die 262 that is necessary due to the types of fillers and reinforcement materials used. Here, a wider slit 284 is necessary to allow proper distribution of the resin paste 230 on the line.

Of course, while the preferred embodiment of the present invention discloses volumetric paste extrusion device 208, 216, 226, and 244 to distribute the respective sheet molding pastes, other alternative extruder means may be used in conjunction with or replacing the above dies. Two more preferred examples are shown below in FIGS. 23 and 24.

Figure 23:
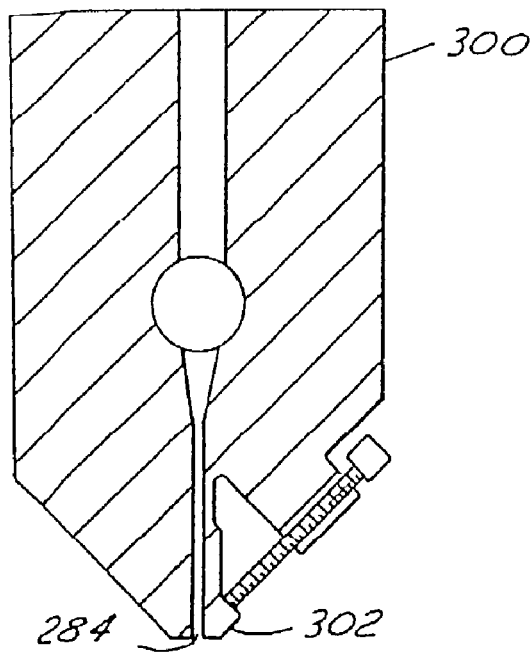
FIG. 23 depicts another preferred embodiment of a slit extrusion die that can be used in the volumetric paste extrusion devices of FIGS. 19 and 21 having a deformable lip.

Referring now to FIG. 23, a slit extrusion die 300 may replace one or more the slit extrusion dies 262 of the volumetric paste extrusion devices 208, 216, 226 and 244. The slit extrusion die 300 operates similarly to the die 262 of FIGS. 19–22. The one difference is that the slit extrusion die 300 has a deformable lip 302 that allows the control of the gap of the slit 284 in order to balance the right-left linear throughput mentioned above and more generally to ensure an equal throughput all along the slit 284 and across the compounding line width.

Figure 24:
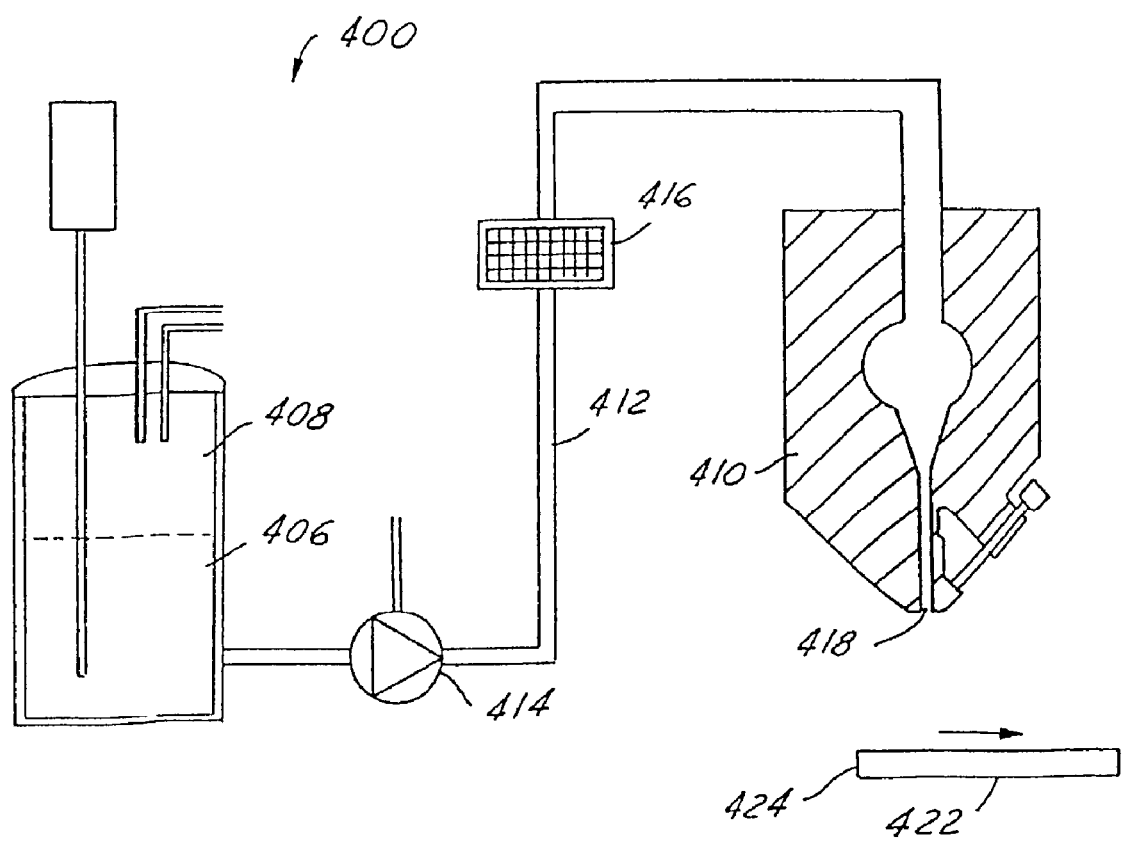
FIG. 24 depicts another preferred embodiment of a volumetric paste extrusion device that can be used in FIGS. 17 and 18.

Referring now to FIG. 24, another embodiment of the volumetric paste extrusion device 400 is depicted. Here, in operation, the sheet molding paste 406 contained in the paste tank 408 is pumped from the tank 408 through a filter 416 to the slit extrusion die 410 through line 412 by volumetric pump 414. The filter 416 prevents large particulate matter from being applied to the sheet molding layers 424. The paste 406 is then pumped out through slit 418 contained on the die 410 in a manner similar to the slit extrusion dies 262, 300 of FIGS. 19–23 and onto the conveyor belt 422 containing the previously applied sheet molding layers 424.

Further, other embodiments of extruders and or replacing the volumetric paste extrusion devices of FIGS. 19–24 are contemplated. These include extruders having cylinder attachments to force the sheet molding paste through slits or extruders having appropriately designed distribution channels to feed the slit in place of the Archimedes screw device 264. Additionally, the funnel device described above, or a conventional dispensing device may be found useful to apply one or more layers of paste. Additionally, the volumetric dispensers are useful in combination with the conductive paste layers described above.

Further, a variety of additional controls may be added to the volumetric paste extrusion devices depicted in FIGS. 19–24 and to additional types of extruders listed above as are known in the art. For example, devices such as heating elements and other measurement devices may be added to control the viscosity of the paste within various portions of the volumetric paste extrusion devices. In addition, a vacuum degassing device (not shown) may be incorporated into one or more of the volumetric paste extrusion devices which is used to remove entrained air from the respective pastes. This vacuum degassing device is typically equipped with a receiving vessel that is under pressure and allows the paste to be removed at lower rotational speeds to reduce heat buildup.

The present invention offers important advantages over presently available sheet molding compound based composite materials. First, the use of volumetric dosing techniques allows multiple layers of sheet molding paste and reinforcement to be added along one compounding line, thereby allowing the production of thicker composite sheets 271 in one compounding process. This reduces the number of composite sheets 271 that are required to be loaded into a mold to form a composite part. This increases manufacturing efficiency by reducing the amount of carrier film sheets that must be removed prior to molding. Additionally, this increases the productivity of the sheet molding compound line as the line speed remains essentially unchanged with respect to prior art.

Second, the use of volumetric dosing techniques to apply sheet molding paste allows for higher consistency in composite sheet 271 weight as compared with composite sheets made using a traditional doctor box type application system. The need to control the weight of the composite sheet 271 charge as in the prior art is overcome, thereby improving consistency in molding from part to part that may result in composite parts having improved mechanical and aesthetic characteristics.

Third, the top layer of sheet molding paste 206 is specifically constituted to be void free and to follow the "plug flow" of the unique underlying charge so to cover up the whole of the visible Class A surface of the, composite part. With such a "pore free" layer, the need for long flow of the sheet 271 to expel air is suppressed. "Plug flow" is a rheological term to describe flow type where the material essentially behaves as a "deformable body" that keeps much integrity and thus progresses with little shear deformation. This type of flow is opposite of what is found in the injection of thermoplastics, where the material in the center of the cavity gap flows faster than the material along the surface. This type of flow is known as "fountain flow".

Fourth, the present invention result is a sheet molding composite sheet 271 that may have one or more specialized attributes within its layers, including for example a top layer with no entrapped air, a conductive top layer, a colored or light stabilized top layer, a conductive EMI shielded top layer, and a low density or low cost reinforced middle region. This allows for sheet molding composite parts having improved surface finishes, lower weight, and that offer recycling solutions.

Fifth, the combination of a void free top layer and thick charge capabilities with this new technology allows for usage of a charge that is made of one top sheet molding composite sheet 271 to form a molded composite part having a class A visible surface. Depending upon the desired thickness of the composite part to be formed, one or more charges of traditional sheet molding composite sheets or additional charges of the composite sheet 271 of the present invention may be added beneath the top layer of the composite sheet 271.

While the invention has been described in terms of preferred embodiments, it will be understood, of course, that the invention is not limited thereto since modifications may be made by those skilled in the art, particularly in light of the foregoing teachings.

What is claimed is:

1. A sheet molding composite sheet for use in structural reinforced compression molded composite parts, the sheet comprising in an uncompacted form between a pair of outer film layers:
    a first layer of resin paste applied to one of the pair of outer film layers;
    a second layer of resin paste applied to the other of the pair of outer film layers;
    n layers of nonwoven discrete filaments or reinforcement fibers, wherein the filaments or fibers do not melt when exposed to a temperature of 200 degrees C. for twenty seconds; and
    (n−1) layers of resin paste volumetrically applied to between each of said n layers of reinforcement fibers using a volumetric paste extrusion device so as to provide alternating layers of nonwoven discrete filaments or reinforcement fibers and resin paste, wherein n is at least 2.

2. The sheet molding composite sheet of claim 1, wherein at least one of said (n−1) layers of resin paste is a bulk molding compound layer.

3. The sheet molding composite sheet of claim 2, wherein said bulk molding compound layer is volumetrically applied using a volumetric paste extrusion device having a bulk molding volumetric slit extrusion die.

4. The sheet molding composite sheet of claim 2, wherein said bulk molding compound layer contains low-density fillers.

5. The sheet molding composite sheet of claim 2, wherein said bulk molding compound layer contains recycled materials of various granulometry and morphology.

6. The sheet molding composite sheet of claim 1, wherein said first layer of resin paste is volumetrically applied using a volumetric paste extrusion device.

7. The sheet molding composite sheet of claim 1 wherein said first layer and said second layer are volumetrically applied using a volumetric paste extrusion device.

8. The sheet molding composite sheet of claim 1, further comprising introducing at least one layer of a preformed veil in place of a respective one of said layers of reinforcement fibers.

9. The sheet molding composite sheet of claim 1, wherein said veil comprises a binder substantially soluble in said paste.

10. A sheet molding composite sheet for use in structural reinforced compression molded composite parts, the sheet comprising in an uncompacted form between a pair of outer film layers:
    a first layer of resin paste applied to one of the pair of outer film layers;
    a second layer of resin paste applied to the other of the pair of outer film layers;
    n layers of irregularly shaped reinforcement filaments or fibers; and
    (n−1) layers of resin paste volumetrically applied to between each of said n layers of reinforcement fibers using a volumetric paste extrusion device so as to privede alternating layer of nonwoven discrete filaments or reinforcement fibers and resin paste, wherein n is at least 2.

11. The sheet of claim 1 wherein said fibers or filaments comprise glass fibers or filaments.

* * * * *